United States Patent
Choi et al.

(10) Patent No.: US 11,632,914 B2
(45) Date of Patent: Apr. 25, 2023

(54) SMART PLANT CULTIVATION DEVICE AND SMART PLANT CULTIVATION SYSTEM USING IOT

(71) Applicant: SK MAGIC CO., LTD, Seoul (KR)

(72) Inventors: Sun Muk Choi, Suwon-si (KR); Oh Yong Kwon, Hwaseong-si (KR); Seung Hun Choi, Suwon-si (KR); Jae Sung Park, Yongin-si (KR)

(73) Assignee: SK MAGIC CO., LTD., Seoul (KR)

( * ) Notice: Subject to any disclaimer, the term of this patent is extended or adjusted under 35 U.S.C. 154(b) by 22 days.

(21) Appl. No.: 17/272,306

(22) PCT Filed: Apr. 10, 2019

(86) PCT No.: PCT/KR2019/004281
§ 371 (c)(1),
(2) Date: Feb. 27, 2021

(87) PCT Pub. No.: WO2020/045783
PCT Pub. Date: Mar. 5, 2020

(65) Prior Publication Data
US 2021/0204489 A1 Jul. 8, 2021

(30) Foreign Application Priority Data

Aug. 30, 2018 (KR) .......................... 10-2018-0103055
Aug. 30, 2018 (KR) .......................... 10-2018-0103056
(Continued)

(51) Int. Cl.
*A01G 7/04* (2006.01)
*A01G 9/02* (2018.01)
(Continued)

(52) U.S. Cl.
CPC .............. *A01G 9/028* (2013.01); *A01G 7/045* (2013.01); *A01G 24/48* (2018.02); *G05B 15/02* (2013.01);
(Continued)

(58) Field of Classification Search
CPC ....................................................... A01G 7/045
See application file for complete search history.

(56) References Cited

U.S. PATENT DOCUMENTS 9,220,202 B2 * 12/2015 Maxik ................... H05B 47/16
10,694,681 B2 * 6/2020 Topps ..................... A01C 1/00
2015/0089867 A1 * 4/2015 Abbott ....................... A01G 9/00
47/58.1 LS
(Continued)

FOREIGN PATENT DOCUMENTS

CN 104053355 A * 9/2014 ............. A01G 31/02
DE 2016104616 8/2016
(Continued)

OTHER PUBLICATIONS

Office Action for Korean Patent Application No. 10-2018-0103055, dated Oct. 16, 2018.
(Continued)

*Primary Examiner* — Joshua D Huson
*Assistant Examiner* — Alanna K Peterson

(57) ABSTRACT

The present invention provides a smart plant cultivation device and a smart plant cultivation system which, by using an Internet of things (IoT) technology, can automatically configure a cultivation environment according to a variety of plants, automatically perform zoning control of a light source module, and monitor and record a cultivation process of a plant through a user device.

16 Claims, 18 Drawing Sheets

(30) Foreign Application Priority Data

| | | | |
|---|---|---|---|
| Aug. 30, 2018 | (KR) | ........................ | 10-2018-0103057 |
| Aug. 30, 2018 | (KR) | ........................ | 10-2018-0103058 |
| Aug. 30, 2018 | (KR) | ........................ | 10-2018-0103059 |
| Aug. 30, 2018 | (KR) | ........................ | 10-2018-0103060 |
| Aug. 30, 2018 | (KR) | ........................ | 10-2018-0103061 |

(51) Int. Cl.
    *A01G 24/48*     (2018.01)
    *G16Y 10/05*     (2020.01)
    *G05B 15/02*     (2006.01)
    *G06Q 30/0601*     (2023.01)
    *G06Q 50/02*     (2012.01)

(52) U.S. Cl.
    CPC .......... *G16Y 10/05* (2020.01); *G06Q 30/0633* (2013.01); *G06Q 50/02* (2013.01)

(56) References Cited

U.S. PATENT DOCUMENTS

| | | | | |
|---|---|---|---|---|
| 2018/0325038 | A1* | 11/2018 | Spiro | ...................... A01G 9/045 |
| 2019/0008096 | A1* | 1/2019 | Lee | ......................... A01G 7/045 |
| 2020/0380438 | A1* | 12/2020 | Briggs | ................. A01G 9/0295 |

FOREIGN PATENT DOCUMENTS

| | | |
|---|---|---|
| JP | 2015019634 | 2/2015 |
| JP | 2017136046 | 8/2017 |
| KR | 101212130 | 12/2012 |
| KR | 101249485 | 4/2013 |
| KR | 20130115611 | 10/2013 |
| KR | 101326435 | 11/2013 |
| KR | 20140125994 | 10/2014 |
| KR | 20160014876 | 2/2016 |
| KR | 20160118219 | 10/2016 |
| KR | 20160142599 | 12/2016 |
| KR | 20180062076 | 6/2018 |
| KR | 20180072641 | 6/2018 |
| KR | 20180083739 | 7/2018 |
| WO | WO-2018068042 A1 * | 4/2018 ............. A01G 31/02 |

OTHER PUBLICATIONS

Office Action for Korean Patent Application No. 10-2018-0103056, dated Oct. 19, 2018.
Office Action for Korean Patent Application No. 10-2018-0103057, dated Oct. 16, 2018.
Office Action for Korean Patent Application No. 10-2018-0103058, dated Oct. 16, 2018.
Office Action for Korean Patent Application No. 10-2018-0103059, dated Oct. 16, 2018.
Office Action for Korean Patent Application No. 10-2018-0103061, dated Oct. 16, 2018.
European Search Report for EP19854028, dated Apr. 29, 2022.
Office Action for Chinese Patent Application No. 201980057010, dated May 27, 2022.

* cited by examiner (1)

(2)

(3)

(Off)

(On)

(1)

(2)

SMART PLANT CULTIVATION DEVICE AND SMART PLANT CULTIVATION SYSTEM USING IOT

FIELD OF INVENTION

The present invention relates to a smart plant cultivation device and a smart plant cultivation system using IOT.

BACKGROUND OF INVENTION

Internet of Things (IoT) represents a technology that enables people to interact with information between a person and things or between things based on the Internet. A sensor and a communication module are built in different things (or objects) to be connected to the Internet. IOT allows objects connected to the internet to exchange information to each other, analyze the same and provide the learned information to the user, or allows the user to remotely monitor and control objects through the internet.

As such IOT technology is developed, construction of a smart home is becoming realized. Smart home refers to a technology in which all devices in a home including home appliances such as TV, air conditioner, refrigerator, etc., energy consumption devices such as water, electricity, lighting, heating and/or cooling devices, security devices such as door lock and CCTV, etc., are connected to the internet and can be remotely monitored and controlled by a user.

A plant cultivation device is a device that artificially controls environment of a cultivation space and grow seeds or seedling into mature plants. For instance, a plant cultivation device may create artificial illumination environment by electronic control of a light source module, create artificial moisture and nutrient environments by electronic control of a culture medium module, and also create artificial air stream environment and warm or heat environments.

Meanwhile, according to the needs of consumers who desire a well-being life and a high quality foodstuff, a plant cultivation device useable as a household appliance is recently introduced in the market.

However, a typical plant cultivation device used in a house encounters problems in which desired cultivation environments cannot be preset in consideration of species or kinds of the plants, zoning of the light module cannot be controlled, no means for intuitionally monitoring the grow of a plant and then recording (making a database) by the user is not included.

PRIOR ART DOCUMENT

Korean Patent Laid-Open Publication No. 10-2017-0125783 (laid-open on Nov. 15, 2017)

SUMMARY OF INVENTION

Technical Problem to be Solved

The object of the present invention is to provide a smart plant cultivation device and a smart plant cultivation system using IOT technology, each of which automatically sets desired cultivation environments according to species of cultivated plants, automatically performs zoning control of a light source module, and may monitor and record a plant growing process using IoT.

Objects to be solved by the present invention are not particularly limited to the above one, other objects not mentioned herein will also be obviously understood by those skilled in the art from the following description.

Technical Solution

The plant cultivation device according to an aspect of the present invention to solve the above problems may include: a case having a cultivation space; a tray disposed in the cultivation space and provided with a plurality of capsule accommodation parts on which plural capsules are placed; a sensor module that senses the plural capsules and generates sensing information; a light source module that emits light into the cultivation space; a culture medium module for feeding a culture medium on the tray; an air conditioning module that executes at least one operation of re-feeding (or recycling) a gas in the cultivation space or feeding external air to the cultivation space; and a control module that receives sensing information transmitted from the sensor module and controls at least one of the light source module, the culture medium module and the air conditioning module using the sensing information.

The sensing information may include species sensing information on each species of plants in the plural capsules.

The control module may control the light source module using the species sensing information such that an illumination value of the cultivation space becomes an average of desirable illuminations of the plural capsules.

The control module may use the species sensing information and implement at least one operation selected from: control of the culture medium module such that a concentration of the culture medium fed to the tray becomes an average of desirable concentrations of the culture media in the plural capsules; control of the culture medium module such that a feeding cycle of the culture medium fed to the tray becomes an average of desirable feeding cycles of the culture media in the plural capsules; and control of the culture medium module such that a feeding amount of the culture medium fed to the tray becomes an average of desirable feeding amounts of the culture media in the plural capsules.

The control module may use the species sensing information and implement the air conditioning module such that a temperature of gas in the cultivation space becomes an average of desirable temperatures in the plural capsules.

Each of the plural capsule accommodation parts may be in an active state in which at least one of the capsules is accommodated and in an inactive state in which at least one of the capsules is not accommodated, while the sensing information may include state sensing information on the state of each capsule accommodation part.

The light source module may include plural lamps, and the plural lamps may be grouped into a plurality of lamp groups, while the control module may independently control the plural lamp groups using the state sensing information.

With regard to the plural lamps, lamps having the same capsule accommodation parts facing each other ("mutually-facing capsule accommodation parts") among the plural capsule accommodation parts may undergo grouping.

The plural capsule accommodation parts may be arranged in plural rows and plural columns. With regard to the plural lamps, lamps positioning in a row on which the same mutually-facing capsule accommodation parts among the plural capsule accommodation parts are present, may undergo grouping or, otherwise, lamps positioning in a column on which the same mutually-facing capsule accommodation parts among the plural capsule accommodation parts are present, may undergo grouping.

The plant cultivation system according to an aspect of the present invention to solve the above problems may include: plural capsules; the plant cultivation device in which the plural capsules are accommodated; a user device communicating with the plant cultivation device, wherein the user device may display cultivation information image based on the sensing information of the plant cultivation device.

Effect of Invention

According to the present invention, there is provided a plant cultivation system that automatically sets cultivation environments according to species of the plant, and may intuitionally monitor a plant cultivation process using application ("App") stored in a smartphone and then record the same.

Effects of the present invention are not particularly limited to the above effects, and other effects not mentioned herein will be obviously understood by those skilled in the art from the following description.

BEST MODE

Figure 1:
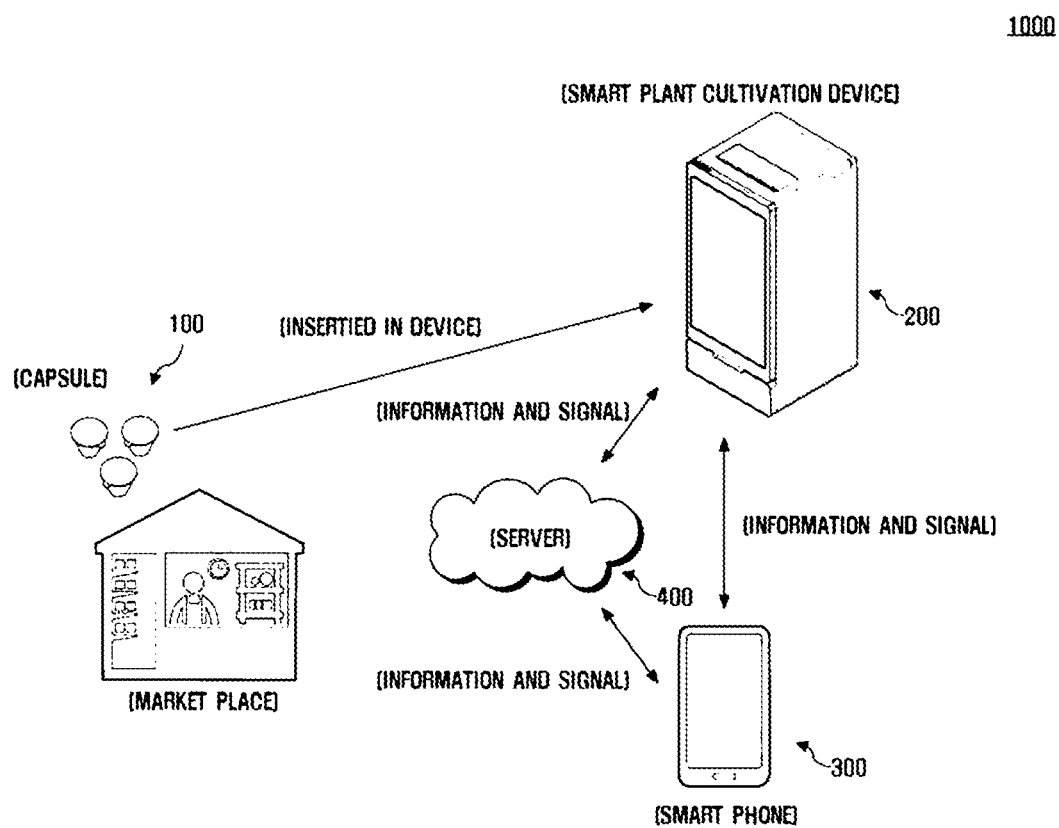
FIG. 1 is a conceptual diagram illustrating a plant cultivation system of the present invention.

The advantages and features of the present invention and the manner of achieving them will become apparent by means of the embodiments described in detail below with reference to the accompanying drawings. However, it should be understood that the invention is not limited to the disclosed embodiments but may be embodied in many different forms and should not be construed as limited to the embodiments set forth herein. These embodiments are provided only to complete the description of the present invention and to fully introduce the scope of the present invention to those skilled in the art, to which the present invention pertains. Therefore, the present invention is only defined by the appended claims.

The terminology used herein is for the purpose of illustrating embodiments and is not intended to limit the present invention. In the present specification, a singular form also includes plural forms unless specified otherwise in the specification. The terms "comprises" and/or "comprising" used in the specification do not exclude the present of addition of one or more other elements in addition to the stated element. The same reference numerals refer to the same or similar elements throughout the specification, and "and/or" includes each and all combinations of one or more of the elements mentioned herein. Although "first", "second" and the like are used to describe different components, it is of course understood that these components are not limited by the above terms. These terms are used only to distinguish one component from another. Therefore, the first component mentioned below may be also a second component within the technical scope of the present invention.

Unless defined otherwise, all terms (including technical and scientific terms) used herein may be used in a sense that is commonly understood by those skilled in the art to which the present invention pertains. In addition, terms commonly used and defined in a dictionary are not ideally or excessively interpreted unless explicitly defined otherwise.

The spatially relative terms such as "below", "beneath", "lower", "above" and "upper", etc. may be used to easily describe a correlation between an element and other elements. Such spatially relative terms should be understood in terms of the directions shown in the drawings, including the different directions of components at the time of use or operation. For example, when inverting an element shown in the figures, an element described as "below" or "beneath" of another element may be placed "above" another element. Thus, the exemplary term "below" can include both downward and upwards directions. The components can also be oriented in different directions so that the spatially relative terms can be interpreted according to orientation.

Figure 2:
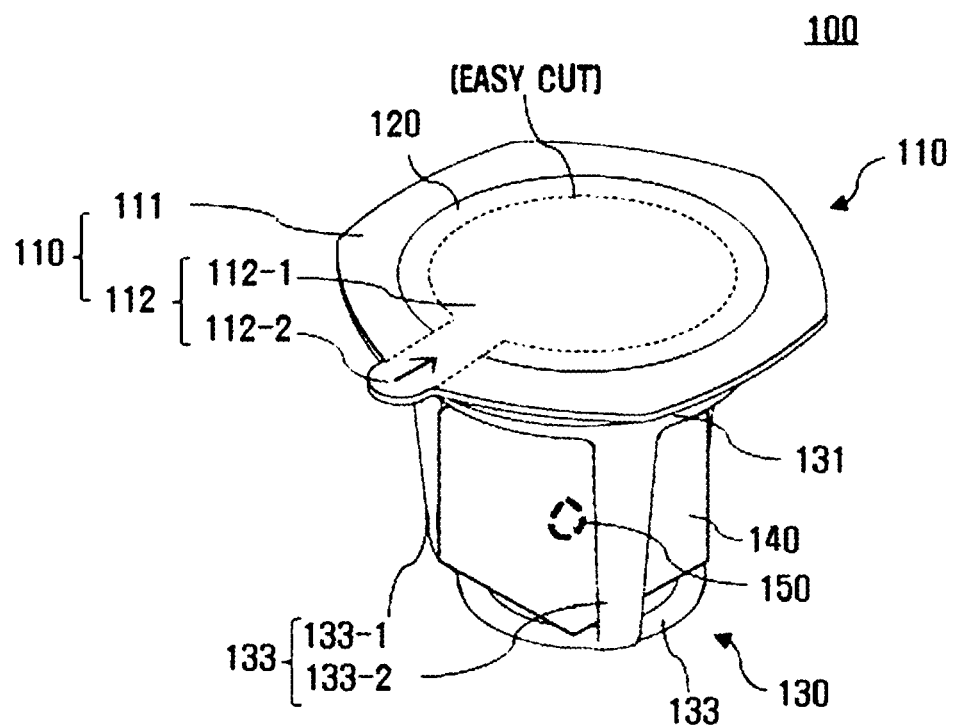
FIG. 2 is a perspective view illustrating a capsule of the present invention.
Figure 3:
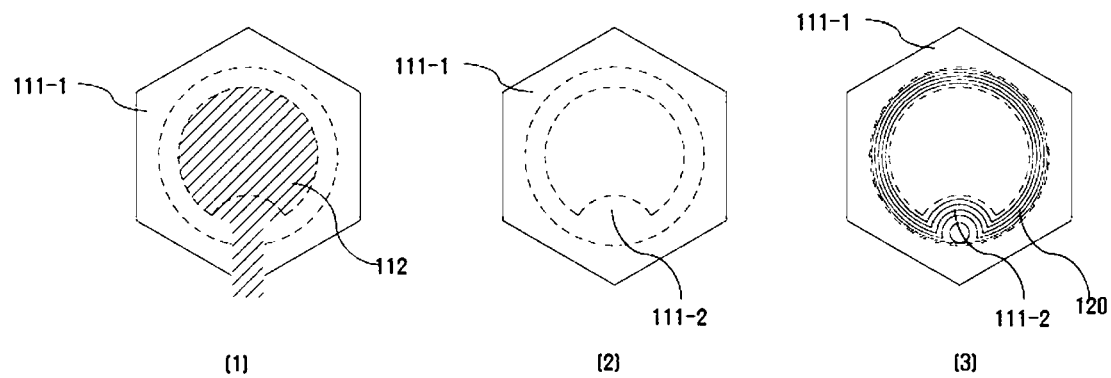
FIG. 3 is a plan view illustrating a state before a cover of the capsule of the present invention is opened (FIG. 3(1)), a state after the cover of the capsule of the present invention is opened (FIG. 3(2)), and a portion of the cover, on which a recognition unit is disposed (FIG. 3(3)).
Figure 4:
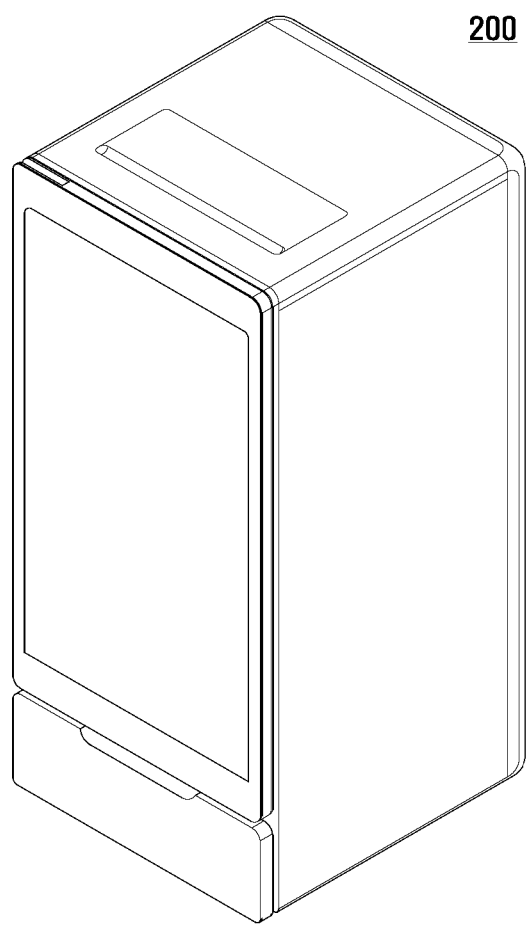
FIG. 4 is a perspective view illustrating a plant cultivation device of the present invention.
Figure 5:
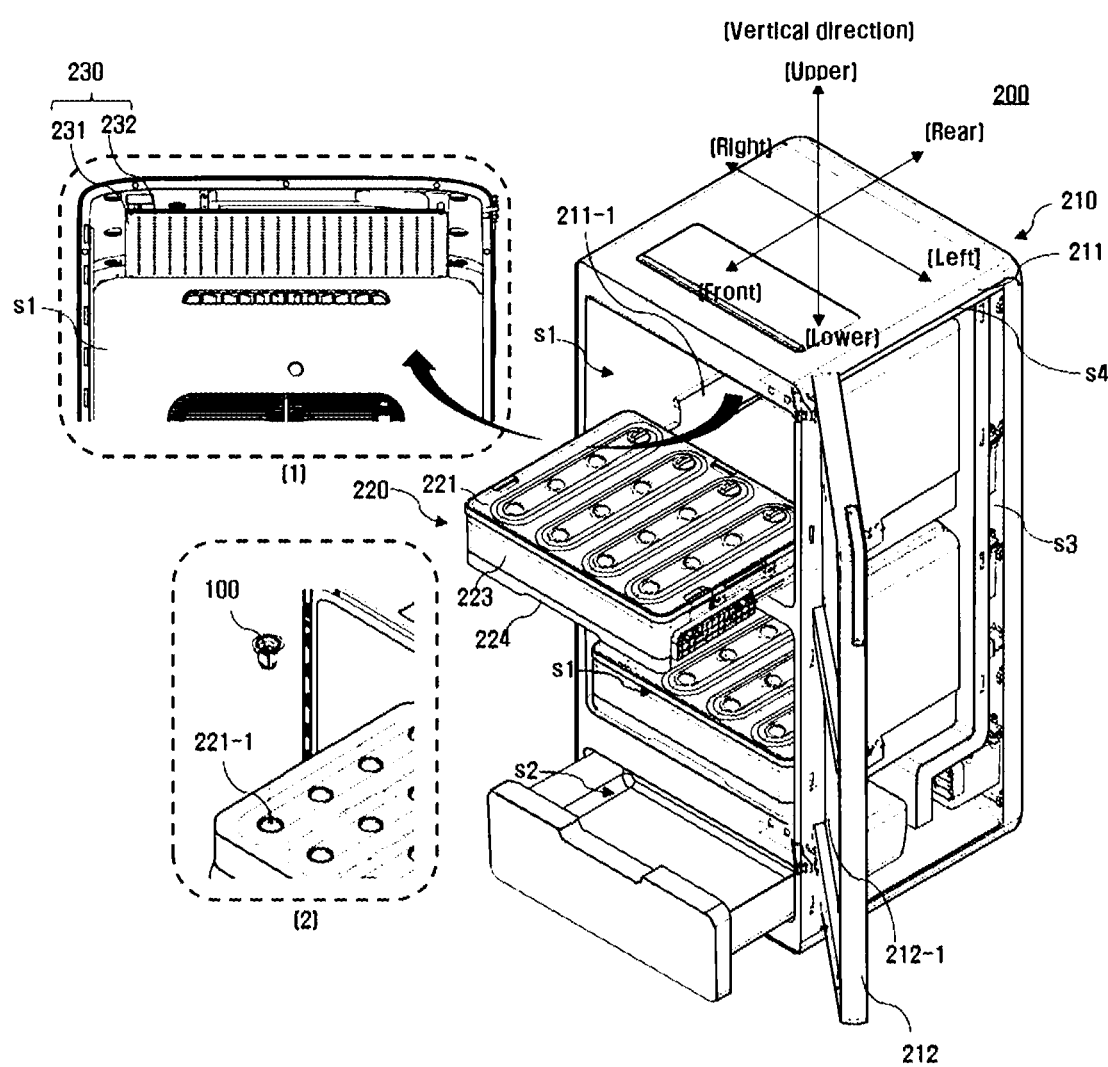
FIG. 5 is a perspective view illustrating a state in which a door is opened in the plant cultivation device.
Figure 6:
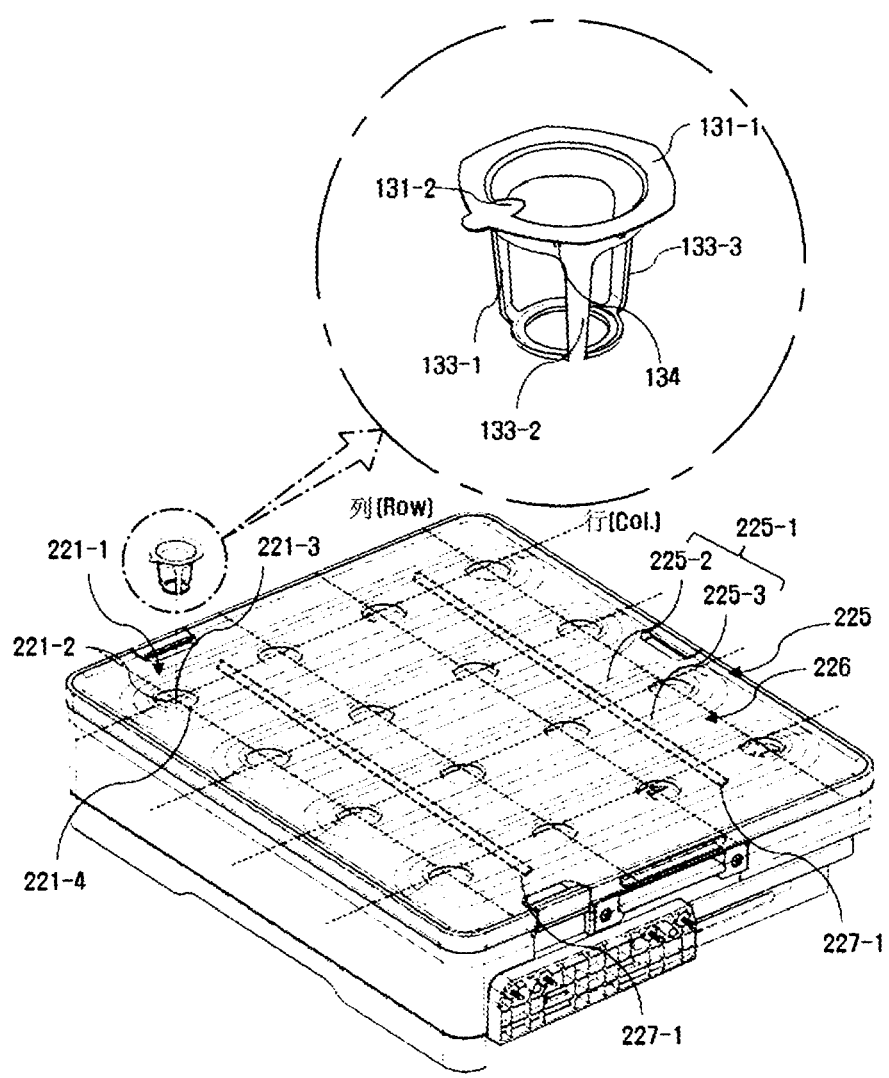
FIG. 6 is a perspective view illustrating the capsule inserted into a tray of the present invention.
Figure 7:
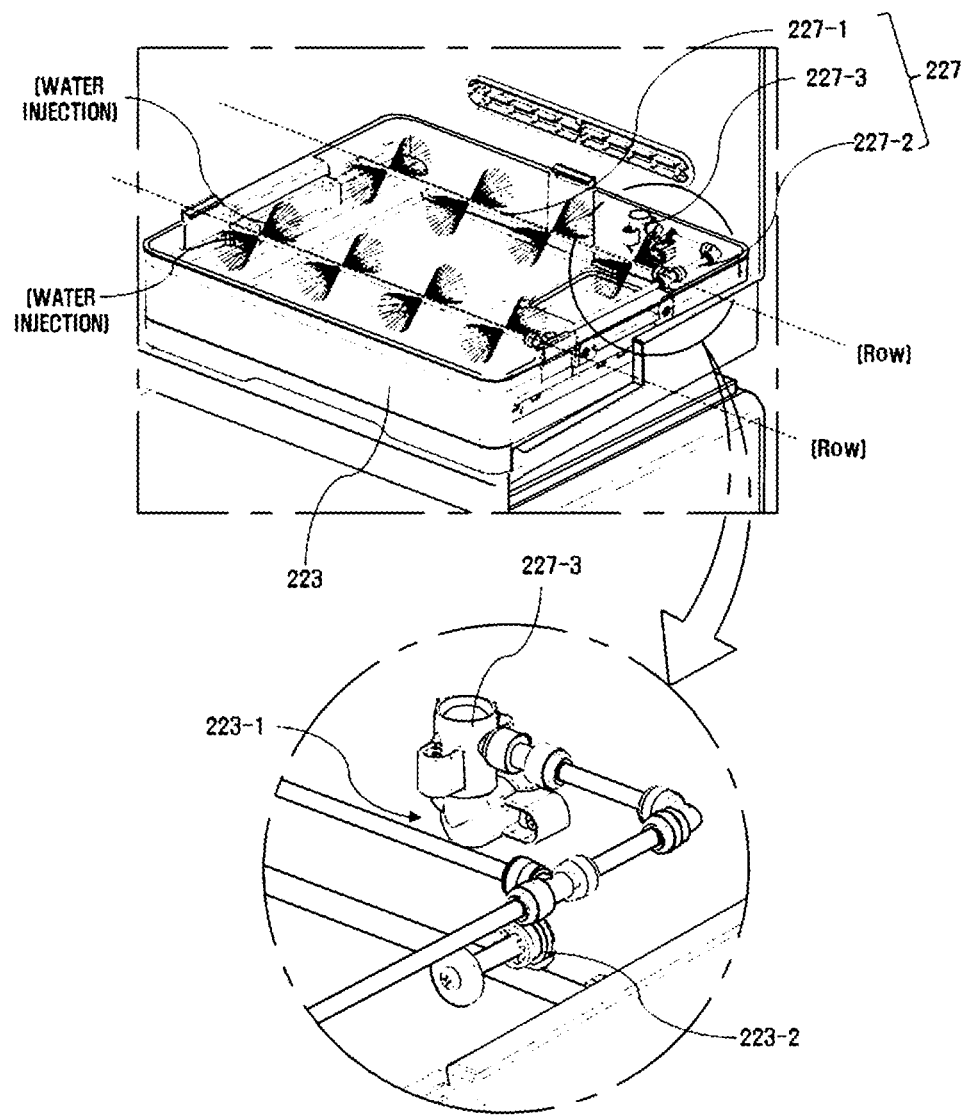
FIG. 7 is a perspective view illustrating the tray of the present invention after removing a top plate from the same.
Figure 8:
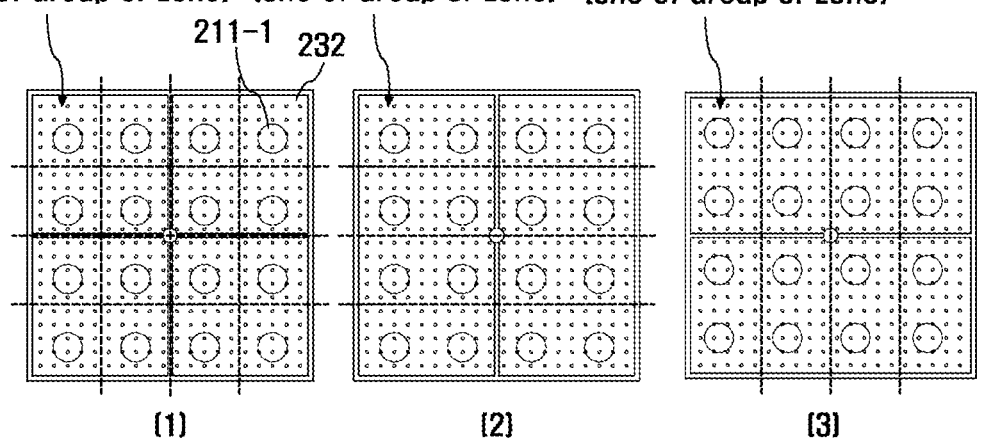
FIG. 8 is a conceptual diagram illustrating zoning control of a light source module of the present invention.
Figure 9:
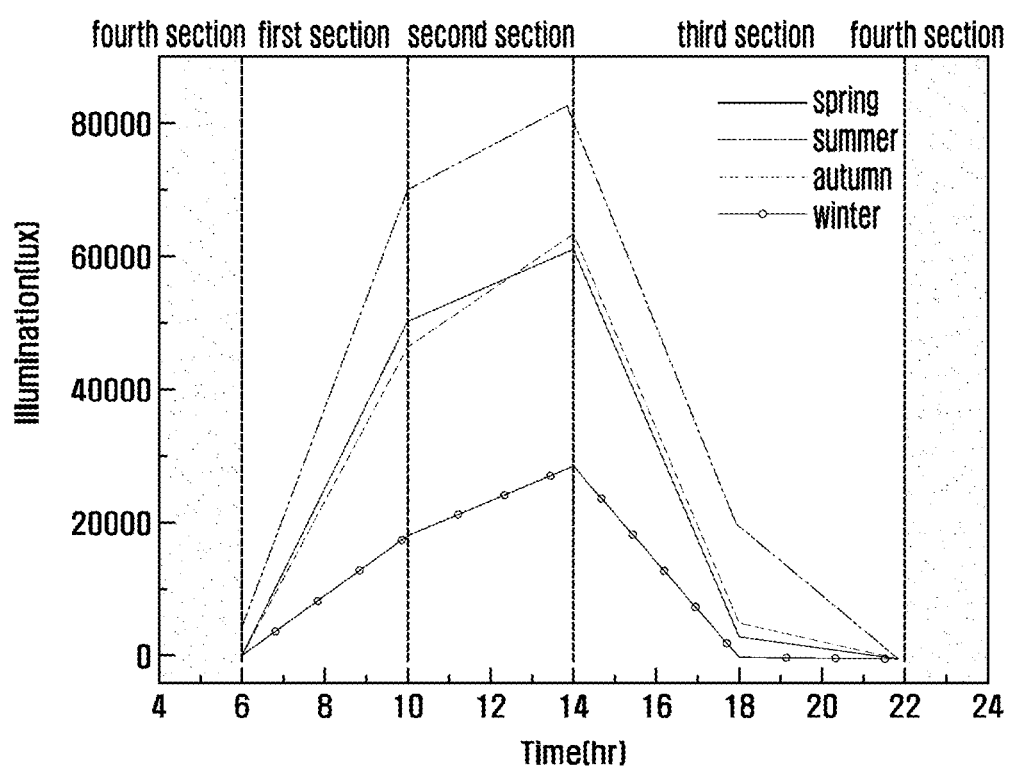
FIG. 9 is a graph showing variation in intensity of illumination of natural light over time.
Figure 10:
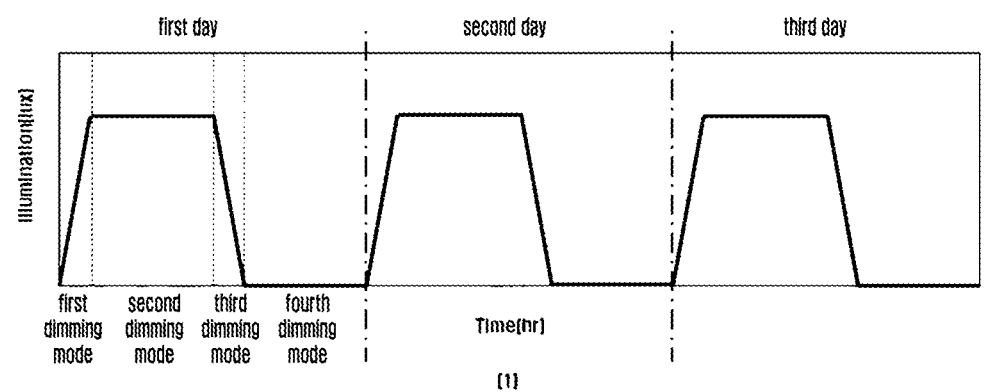
FIG. 10 is a graph showing variation in intensity of illumination of the cultivation space according to dimming control of the light source module.
Figure 10:
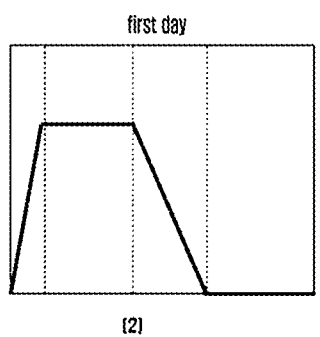
Figure 10:
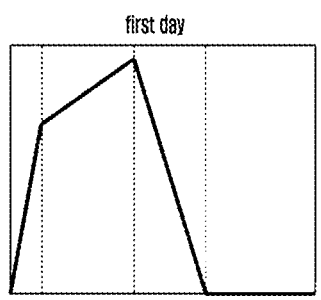
Figure 10:
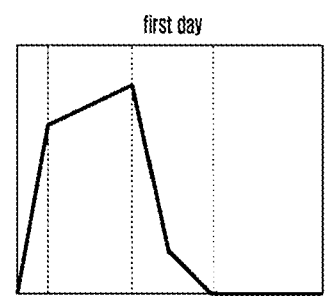
Figure 11:
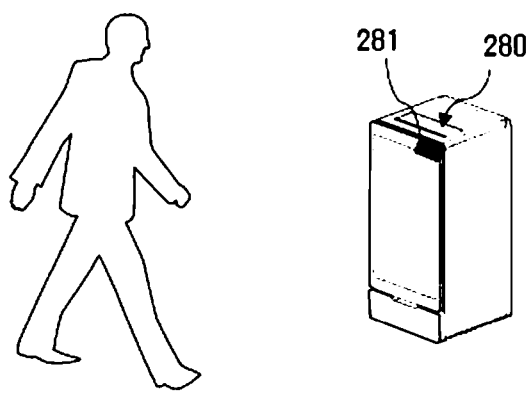
FIG. 11 is a conceptual diagram illustrating a glare occurrence condition.
Figure 11:
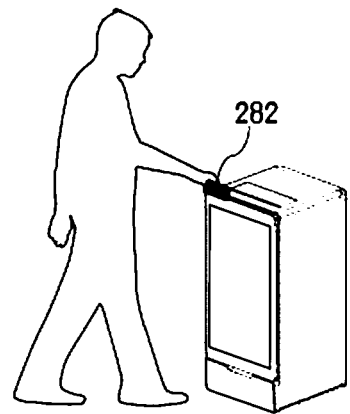
Figure 11:
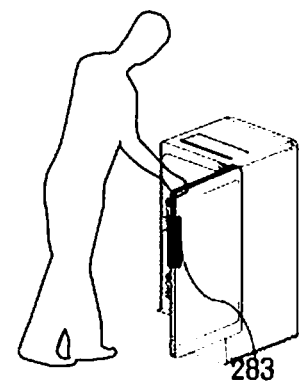
Figure 12:
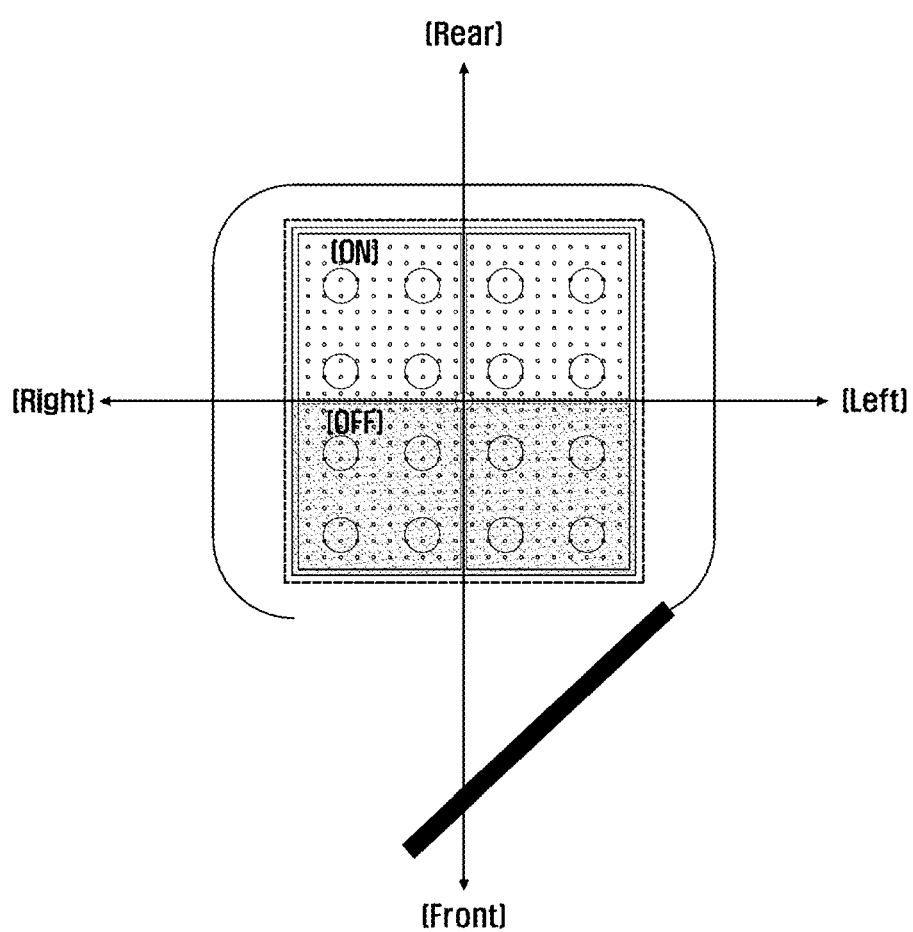
FIG. 12 is a conceptual diagram illustrating that the plural lamps are grouped and controlled independently in the glare occurrence condition
Figure 13:
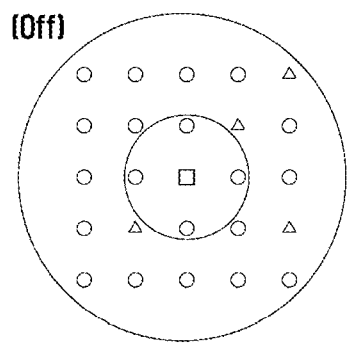
FIG. 13 is a conceptual diagram illustrating illumination growth control of light source module.
Figure 13:
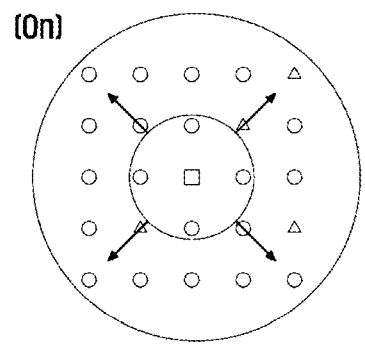
Figure 13:
Figure 13:
Figure 14:
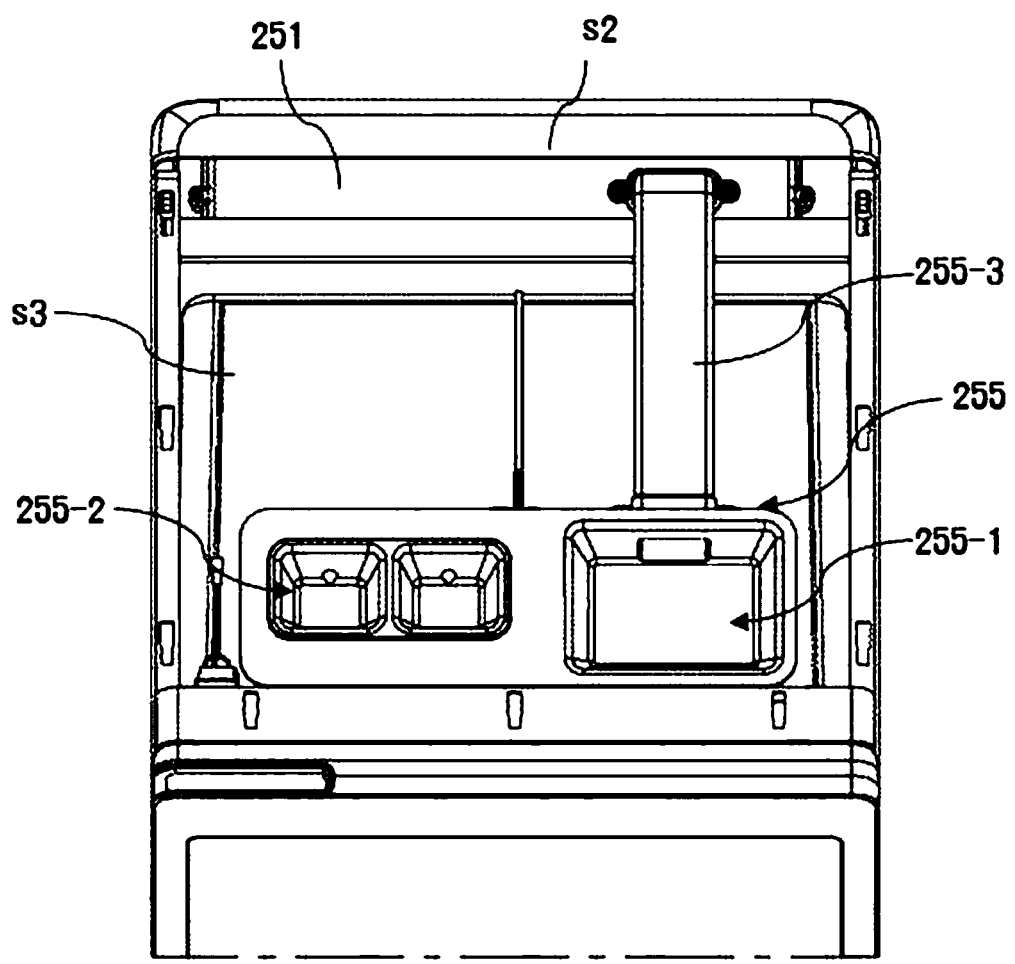
FIG. 14 is a perspective view illustrating a refill port of the present invention.
Figure 15:
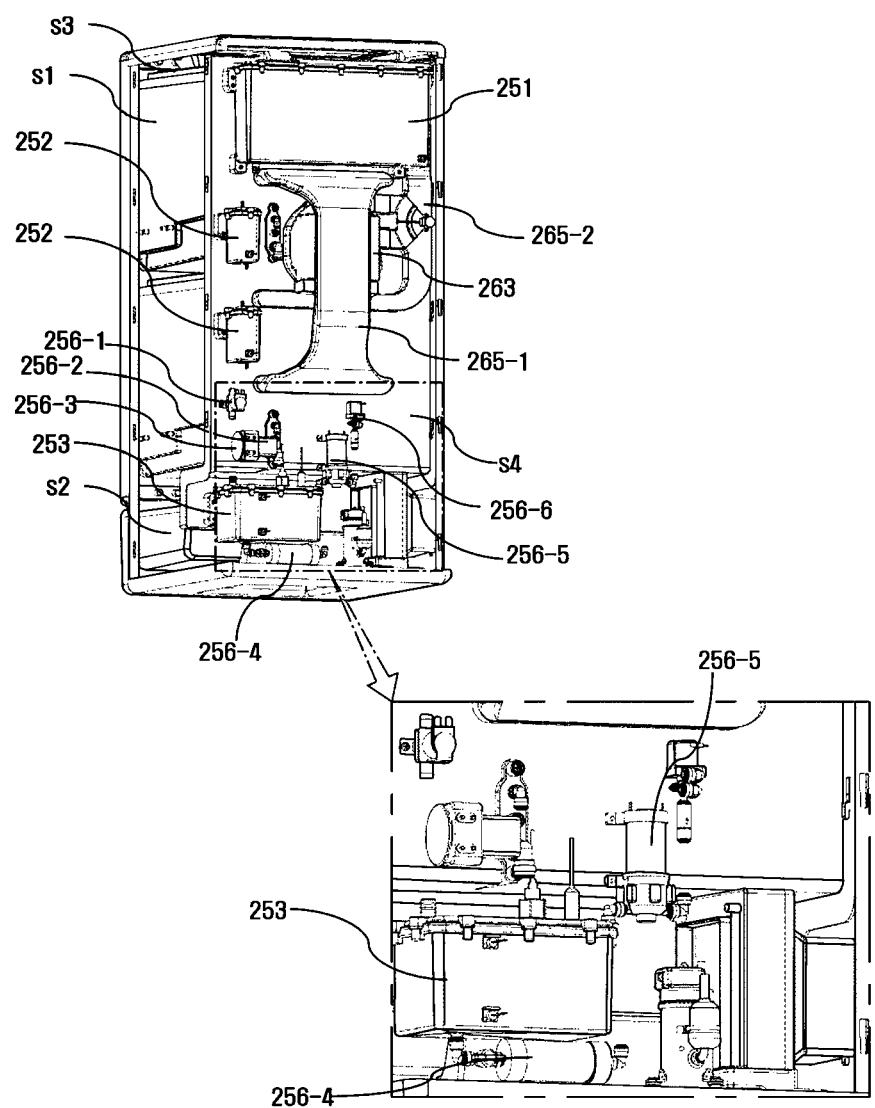
FIG. 15 is a perspective view illustrating the culture medium module and the air conditioning module of the present invention.
Figure 16:
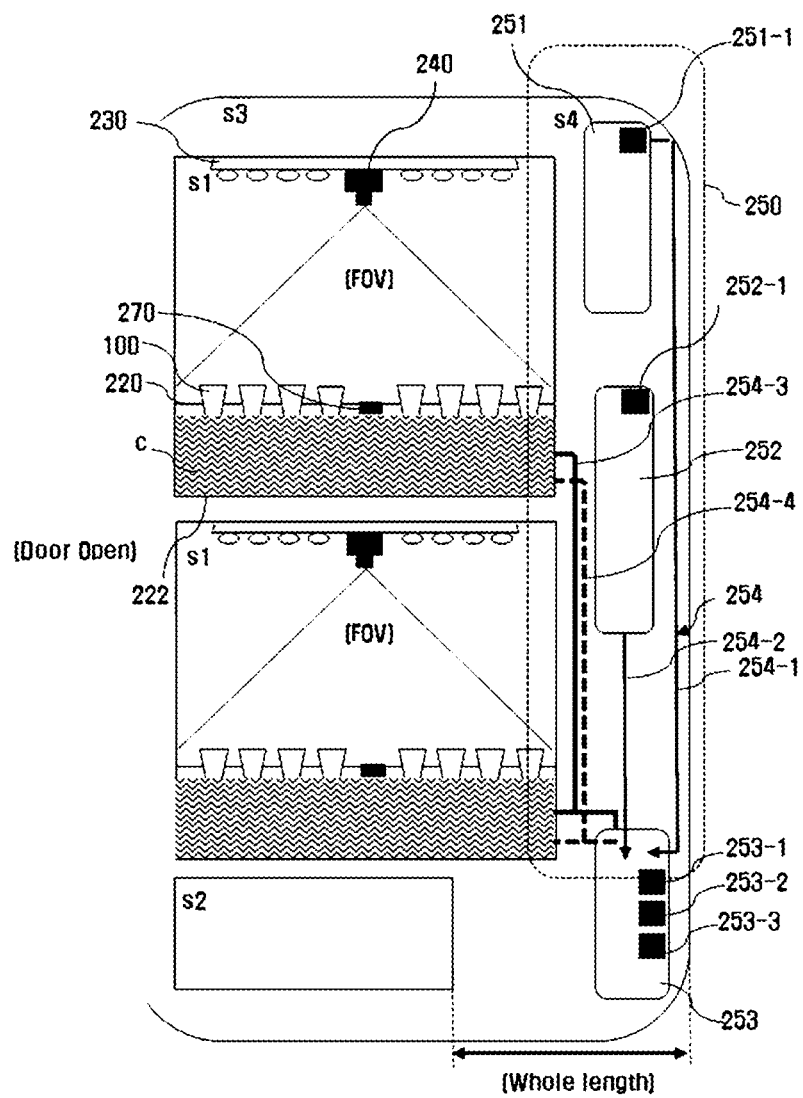
FIG. 16 is a schematic diagram illustrating the culture medium module of the present invention.
Figure 17:
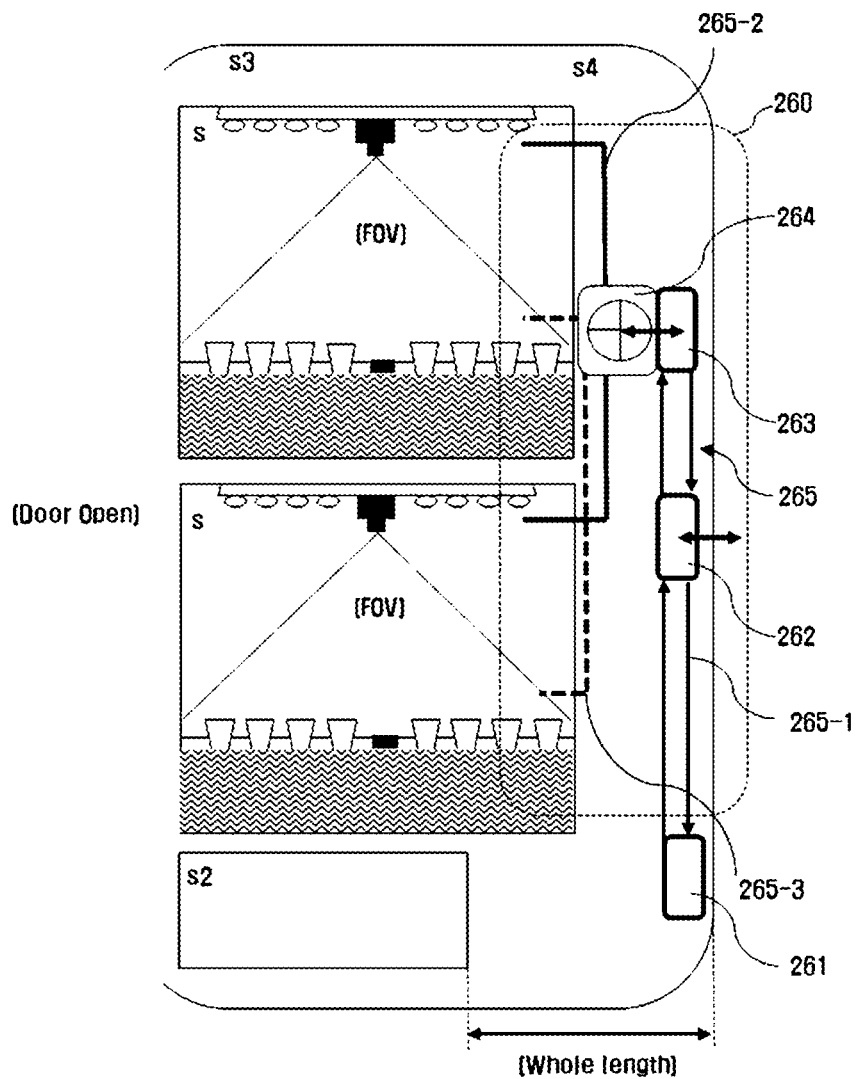
FIG. 17 is a block diagram showing the air conditioning module of the present invention.
Figure 18:
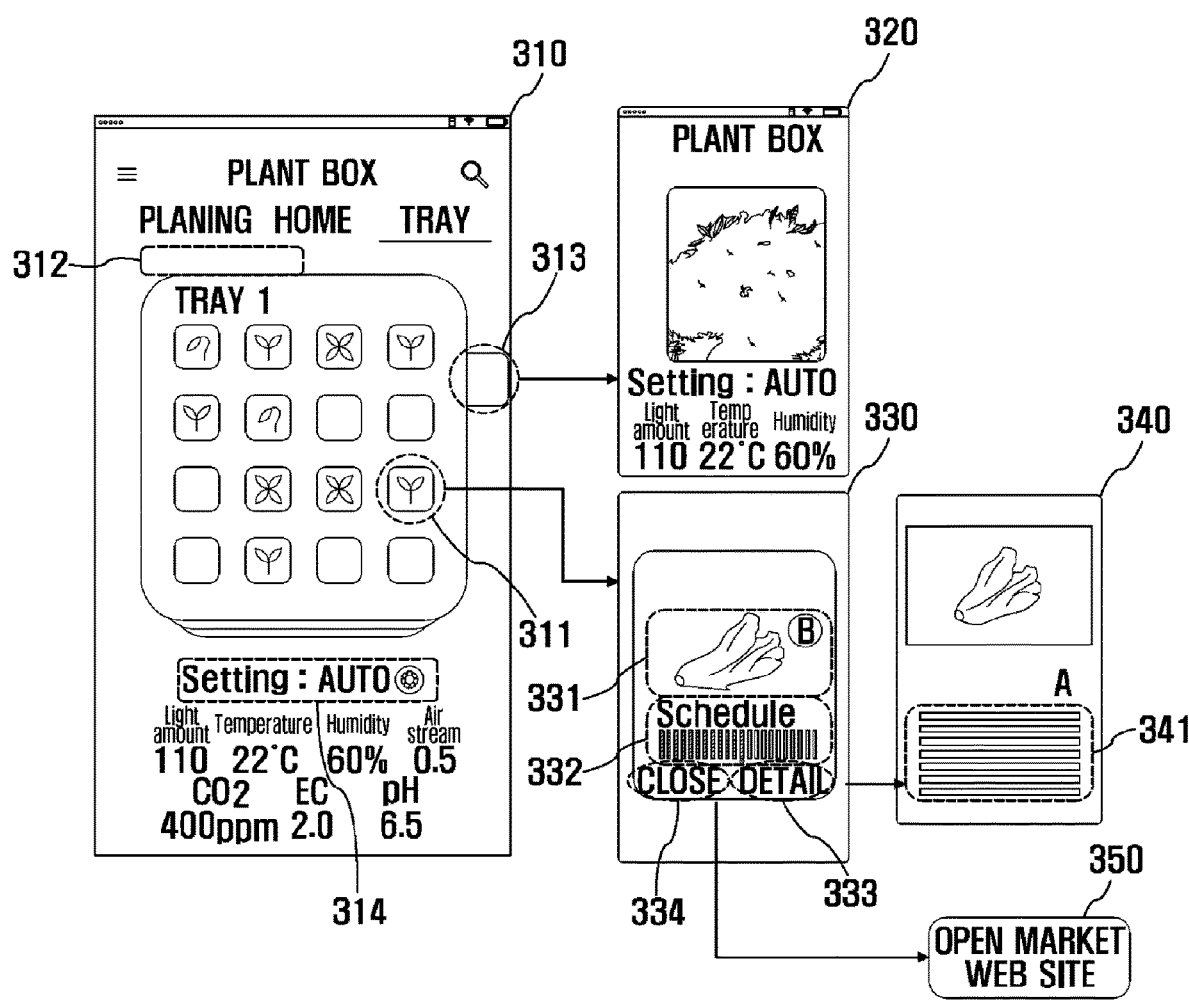
FIG. 18 is a conceptual diagram illustrating a cultivation information image (app list) provided by the user device according to the present invention.

Hereinafter, a plant cultivation system 1000 of the present invention will be described with reference to the drawings. FIG. 1 is a conceptual diagram illustrating a plant cultivation system of the present invention; FIG. 2 is a perspective view illustrating a capsule of the present invention; FIG. 3 is a plan view illustrating a state before a cover of the capsule of the present invention is opened (FIG. 3(1)), a state after the cover of the capsule of the present invention is opened (FIG. 3(2)), and a portion of the cover, on which a recognition unit is disposed (FIG. 3(3)); FIG. 4 is a perspective view illustrating a plant cultivation device of the present invention; FIG. 5 is a perspective view illustrating a state in which a door is opened in the plant cultivation device; FIG. 6 is a perspective view illustrating the capsule inserted into a tray of the present invention; FIG. 7 is a perspective view illustrating the tray of the present invention after removing a top plate from the same; FIG. 8 is a conceptual diagram illustrating zoning control of a light source module of the present invention; FIG. 9 is a graph showing variation in intensity of illumination of natural light over time; FIG. 10 is a graph showing variation in intensity of illumination of the cultivation space according to dimming control of the light source module; FIG. 11 is a conceptual diagram illustrating a glare occurrence condition; FIG. 12 is a conceptual diagram illustrating that the plural lamps are grouped and controlled independently in the glare occurrence condition; FIG. 13 is a conceptual diagram illustrating illumination growth control of light source module; FIG. 14 is a perspective view illustrating a refill port of the present invention; FIG. 15 is a perspective view illustrating the culture medium module and the air conditioning module of the present invention; FIG. 16 is a schematic diagram illustrating the culture medium module of the present invention; FIG. 17 is a block diagram showing the air conditioning module of the present invention; and FIG. 18 is a conceptual diagram illustrating a cultivation information image (app list) provided by the user device according to the present invention.

The plant cultivation system 1000 of the present invention may include a capsule 100, a plant cultivation device 200, a user device 300 and a server 400. In the plant cultivation system 1000 of the present invention, internet of things (IoT) may be applied, and a plant cultivation device 200 to automatically control a cultivation environment of the plant 200 on the basis of sensing information of the capsule 100 is provided. Further, the user can monitor a plant cultivation process in real time through the user device 300 and, at the same time, cultivation record may be stored in the user device 300 in the form of database. Further, the user may remotely control the plant cultivation device 200 through the user device 300 in order to customize the cultivation environment of the plant.

The capsule 100 may be a component in which the seed 150 is packaged. In this case, the seed 150 may be a concept that includes nursery plants germinated by seeds, as well as seeds at their own meanings. The type of capsule 100 may vary depending on the seed species. That is, a single seed to determine the type of capsule 100 may be put in each of the plural capsules 100. In this case, the above expression means that the plural capsules 100 accommodate one kind of seeds, and does not mean that only a single seed 150 is accommodated in the plural capsules 100. Meanwhile, the user may select and purchase the kinds (hereinafter, referred to as "species") of capsules 100 in a market place according to their preference.

The capsule 100 may be disposed in the tray 220 of the plant cultivation device 200. Seeds or seedlings in the capsule 100 may be cultured and matured in the cultivation space s1 of the plant cultivation device 200.

The species of the capsule 100 may be sensed (wirelessly recognized) by the sensor module 280 of the plant cultivation device 200. In this case, various kinds of methods may be used as a wireless recognition method.

For example, the capsule 100 may be wirelessly recognized by an RFID (radio frequency identification) method. However, the present invention is not limited thereto and diverse methods such as bar code, QR-code (Quick Response code), NFC (Near Field Communication), etc. may be used for wireless recognition of the capsule 100.

As described above, the species of the capsule 100 may be identified by the sensor module 270, whereby the sensor module 270 can generate "species information".

The capsule 100 may include a cover 110, a recognition unit 120, a frame 130, an accommodation part 140 and a seed 150.

The cover 110 may be disposed on an upper side of the upper frame 131 of the frame 130. The cover 110 may cover an open portion of the upper frame 131 of the frame 130.

The cover 110 may include a first cover 111 and a second cover 112. The first cover 111 may be a portion that is preserved when a seed cap, that is, the capsule 100 is opened. The first cover 111 may be arranged approximately in a ring form along the upper frame 131 of the frame 130.

The first cover 111 may include a main body 111-1 and an additional region 111-2 protruding radially inward from the main body 111-1 of the first cover 111. The main body 111-1 of the first cover 111 may be disposed on a top surface of a main body 131-1 of the upper frame 131, while the additional region 111-2 of the first cover 111 may be disposed on a top surface of a support part 131-2 of the upper frame 131.

The second cover 112 may be a portion that is removed when the capsule 100 is opened. In order to remove the second cover 112, a boundary between the second cover 112 and the first cover 111 may be formed with an easy-cut.

The second cover 112 may be located approximately at the open portion of the upper frame 131 of the frame 130. The second cover 112 may include a circular main body 112-1 and a protrusion 112-2 protruding outward from the main body 112-1 of the second cover 112. At least a part of the protrusion 112-2 of the second cover 112 may overlap with the first cover 111. In this regard, at least a part of the protrusion 112-2 of the second cover 112 may overlap with not only the main body 111-1 of the first cover 111 but also the additional region 111-2 of the first cover 111 in a vertical direction. On the other hand, after gripping the protrusion 112-2 of the second cover 112, the user can remove the second cover by pulling the protrusion 112-2 of the second cover 112. In order to easily grip the protrusion 112-2 of the second cover 112, the protrusion 112-2 of the second cover 112 may be in a state not adhered to the first cover 111. That is, a bottom surface of the protrusion 112-2 of the second cover 112 may be separated from the top surface of the first cover 111.

The recognition unit 120 may be a portion that is recognized by the sensor module 270 of the plant cultivation device 200. When a RFID system is used as a recognition method of the capsule 110, the recognition unit 120 may be a "Tag".

In this regard, the recognition unit 120 may include an "integrated circuit (IC) chip" in which the "species information" of the capsule 100 is stored, a "wireless communication unit" for wireless communication with the sensor module 270, and a printed circuit board (PCB) on which the "IC chip" and the "wireless communication unit" are mounted. As the PCB board, for example, a flexible printed circuit board (FPCB) may be used.

In addition, a variety of sensing methods may be used for recognition of the capsule 110. For example, there is a method of recognizing an inherent magnetic field generated by the capsule 100 using a hall-sensor. In this case, the recognition unit 120 of the capsule 100 may be a magnetic body that generates inherent magnetic field.

The recognition unit 120 may be disposed inside the first cover 111 of the cover 110. That is, the recognition unit 120 may be covered by the first cover 111 of the cover 110 and may not be exposed to the outside. Accordingly, when the user opens the capsule 100, the recognition unit 120 may be preserved and sensed by the sensor module 270 of the plant cultivation device 200.

The recognition unit 120 may be disposed in the main body 111-1 of the first cover 111 and the additional region 111-2 of the first cover 111. In addition, the recognition unit 120 may be disposed adjacent to the second cover 112. That is, a portion of the recognition unit 120 positioned in the main body 111-1 of the first cover 111 may be disposed radially inside the main body 111-1 of the first cover 111.

Meanwhile, the recognition unit 120 may be disposed at different positions. For example, according to a modification of the present invention, the recognition unit 120 may be disposed in the frame 130. In this case, the recognition unit 120 may be disposed inside a guide 134 of the frame 130.

The frame 130 may be a skeletal member of the capsule 110. A material of the frame 130 may include synthetic resin. The frame 130 may be fabricated by "plastic injection molding". The accommodation portion 140 may be formed inside the frame 130. The cover 110 may be disposed on an upper portion of the frame 130.

The frame 130 may include an upper frame 131, a side frame 132 and a lower frame 133. The upper frame 131 and the lower frame 133 may be ring-shaped and may be spaced apart from each other in a vertical direction (up and down direction). The upper frame 131 may include a ring type main body 131-1 and a support 132-1 protruding radially inward from the ring type main body 131-1. The side frame 132 may connect the upper frame 131 and the lower frame 133. The side frame 132 may include a first side frame 132-1, a second side frame 132-2 and a third side frame (not shown), which are spaced from one another in a circumferential direction.

The frame 130 may include one top opening of the upper frame 131, one bottom opening of the lower frame 133, and three lateral openings formed between the first to third side frames (132-1, 132-2 and not shown). Therefore, the accommodation part 140 disposed in the frame 130 may smoothly absorb external air and moisture through the openings of the frame 130.

The frame 130 may be provided with a guide 134 which is received in a guide receiving part 221-4 at the plural capsule accommodation parts 221-1 of the plant cultivation device 200. In this regard, the guide 134 of the frame 130 may protrude outward from the bottom surface of the upper frame 131 and an outer circumferential surface of the side frame 132. The guides 134 of the plural frames 130 may be spaced apart from one another in the circumferential direction, whereby the guides 134 can be disposed on at least two of the first side frame 132-1, the second side frame 132-2 and the third side frame (not shown), respectively.

The receiving part 140 may be a portion such as a soil in a natural state that receives the seeds 150. A material of the receiving part may include an air-permeable material or a water-absorbable material. For example, the material of the receiving part 140 may include a porous sponge material but is not limited thereto.

The plant cultivation device 200 may be a device for cultivating a plant by presetting cultivation environments through electronic control. Further, the present invention provides a plant cultivation device 200 that can automatically set desired cultivation environments according to species of cultivated plants and enable control of various lightings by application of IoT technology.

The plant cultivation device 200 may include a case 210, a tray 220, a light source module 230, a camera module 240, a culture medium module 250, an air conditioning module 260, a sensor module 270, a sensor unit 280 and a control module (not shown). Such components of the plant cultivation device 200 may be omitted under different design requests.

The case 210 may be a component to form appearance of the plant cultivation device 200. The case may be provided with a cultivation space s1 in which plants are cultivated, an additional space s2 located below the cultivation space s1, a first space s3 located above the cultivation space s1, and a second space s4 located behind the cultivation space s1.

The cultivation space s1 may exist in plural. For example, as shown in FIG. 3, two cultivation spaces s1 laminated to each other may be provided in the plant cultivation device 200.

When the cultivation space s1 is present in plural, each may be provided with the tray 220, the light source module 230 and the camera module 240. That is, the tray 220, the light source module 230 and the camera module 240 may be provided in the same number as the cultivation space s1.

The tray 220, the light source module 230 and the camera module 240 may be disposed in the cultivation space s1 of the case 210. In this case, the tray 220 may be disposed on the bottom surface (lower portion) of the cultivation space s1 of the case 210 while the light source module 230 and the camera module 240 may be disposed on a ceil surface (upper portion) of the cultivation space s1 of the case 210 (see FIG. 5(1))

Meanwhile, the additional space s2 may be a simple storage space or a space for storing cultivated plants. Otherwise, the additional space s2 may be a space in which the plural capsules 100 are stored and cultured to germinate seeds 150 contained in the plural capsules 100. If the additional space s2 is a space for storing cultivated plants, a temperature of the additional space s2 may be automatically controlled or customized. Further, a separate temperature control module may be added or the temperature may be controlled through the air conditioning module 260. Alternatively, if the additional space s2 is a space where the seeds 150 contained in the plural capsules 100 are germinated, a temperature and an intensity of illumination (abbrev. to "illumination") of the additional space s2 may be automatically controlled or customized. Alternatively, a separate temperature control module may be added or the temperature may be controlled through the air conditioning module 260. In addition, a separate light source module may be added.

Meanwhile, the first space s3 and the second space s4 may be connected to each other, and the culture medium module 250 may be located in the first space s3 and the second space s4, while the air conditioning module 260 may be located in the second space s4.

The case 210 may include a main body 211 and a door 212. The main body 211 of the case 210 may have a hollow rectangular shape with approximately open front portion. The cultivation space s1 and the additional space s2 may be formed in a hollow portion of the main body 211 of the case 210, while the first space s3 may be formed on an upper portion of the main body 211 of the case 210. Further, the second space s3 may be formed in the rear of the main body 211 of the case 210.

The main body 211 of the case 210 may be sliding-coupled to the tray 220. To this end, a rail 211-1 may be provided on an inner surface of the main body 211 of the case 210.

The front open portion of the main body 211 of the case 210 may be opened or closed by the door 212 of the case 210. Further, a sealing member (e.g., a gasket) may be disposed at a contact portion between the main body 211 of the case 210 and the door 212. As a result, airtightness of the cultivation space s1 can be maintained (isolation from the outside), thereby providing desired cultivation environments of the plant independent from the outside.

A window 212-1 is formed on the door 212 of the case 212 so that the user can visually confirm the cultivation space s1. Further, since illumination of the cultivation space s1 is set to a high level in accordance with the plant cultivation environment and, in order to prevent glare or ocular injury of the user, the window 212-2 may be provided with a light diffusion coating, a light absorption coating and/or a light reflection coating.

The tray 220 may be disposed in the cultivation space s1 of the main body 211 of the case 210. The tray 220 may be provided in plural. Specifically, the number of trays 220 may be the same as the number of the cultivation spaces s1. In other words, a plurality of trays 220 may correspond to a plurality of cultivation spaces s1, respectively, such that one tray 220 is disposed in one cultivation space s1.

The tray may be detachably coupled to the main body 211 of the case 210 in a sliding manner. In this case, the tray 220 may slide along the rail 211-1 of the main body 211 of the case 210. On the other hand, the user may remove the tray 220 from the case 210 and clean, repair or replace the tray 220 (ease of maintenance and management).

The tray 220 may include an upper plate 221, a lower plate 222, a side plate 223, a handle 224, a plurality of ridges 225, a plurality of troughs 226 and a culture medium injection unit 227.

The upper plate 221 of the tray 220 may be spaced upward from the lower plate 222 of the tray 220, and the side plate 223 of the tray 220 may connect the upper plate 221 of the tray 220 and the lower plate 222 of the tray 220.

By the upper plate 221 of the tray 220, the lower plate 222 of the tray 220 and the side plate 223 of the tray 220, a hollow culture medium chamber c may be formed inside the tray 220.

The plural capsule accommodation parts 221-1, on which a plurality of capsules 100 is arranged, may be formed on the upper plate 221 of the tray 220. In this regard, each of the plural capsule accommodation parts 221-1 may be configured of a hole penetrating the upper plate 221 of the tray 220 and a peripheral region thereof.

As a result, the plural capsules 100 may be accommodated at the plural capsule accommodation parts 221-1 to be exposed to the inside (culture medium chamber) of the tray 220, thereby absorbing the culture medium in the culture medium chamber c of the tray 220. The plural capsule accommodation parts 221-1 of the tray 220 may be arranged along a plurality of rows and a plurality of columns on the upper plate of the tray 220 (see FIG. 8, matrix arrangement).

Each of the plural capsule accommodation parts 221-1 may include a hole 221-2, a support 221-3 protruding inward while forming a step downward in the hole 221-2, and a guide receiving part 221-4 formed in the support 221-3.

In the hole 221-2 of each capsule accommodation part 221-1, each of the plural capsules 110 may be inserted, while the support 221-3 of each capsule accommodation part 221-1 may support the upper frame 131 of each capsule 110 to thus secure the capsule 110. Further, in the guide receiving part 221-4 of each capsule accommodation part 221-1, the guide 134 of each capsule 100 may be received to guide the inserted capsule 100. The guide receiving part 221-4 of each capsule accommodation part 221-1 may be present in plural so as to correspond to a plurality of guides 134 of each capsule 110, respectively. That is, the number of the guide receiving parts 221-4 of each capsule accommodation part 221-1 is equal to the number of the plural guides 134 of each capsule 100, wherein the guide receiving parts and the guides may be spaced apart from each other and arranged in the circumferential direction.

Each capsule accommodation part 221-1 may be in an "active state" in which at least one of the plural capsules 100 is accommodated or in an "inactive state" in which at least one of the plural capsules 100 is not accommodated therein. That is, the user can arrange the plural capsules 110 at any one of the plural capsule accommodation parts 221-1. In this case, any one of the plural capsule accommodation parts 221-1, in which at least one of the plural capsules 100 is accommodated, may become the "active state". On the other hands, any one of the plural capsule accommodation parts 221-1, in which at least one of the plural capsules 100 is not accommodated, may become the "inactive state".

Meanwhile, only one capsule 100 may be accommodated in each of the plural capsule accommodation parts 221-1. That is, the capsule accommodation parts in the active state among the plural capsule accommodation parts 221-1 may correspond to the plural capsules 110 one to one.

Further, the upper plate 221 of the tray 220 may be arranged to face the light source module 230 in a vertical direction (up and down direction). As a result, the plural capsule accommodation parts 221-1 of the tray 220 may also be arranged to face the light source module 230 in the vertical direction (up and down direction). At a bottom surface of the upper plate 221 of the tray 220, the sensor module 270 to sense the plural capsules 110 may be disposed.

The side plate 223 of the tray 220 may be provided with a feed channel 223-1 to supply the culture medium from the culture medium module 240. Further, the lower plate 222 or the side plate 223 of the tray 220 may be provided with a culture medium discharge channel 223-2 to discharge the culture medium of the culture medium chamber c. On the other hand, the discharge channel 223-2 may be provided with a mesh filter capable of filtering foreign substances or impurities (such as twigs of plants) in the culture medium discharged from the culture medium chamber c. As will be described later, with regard to the plant cultivation device 200 of the present invention, since at least a part of the culture medium circulates, the above configuration may be provided to prevent a flow path from being obstructed by the foreign substances in the circulation process.

The handle 224 of the tray 220 may be disposed at the end of a front portion of the lower plate 222 of the tray 220. The user may grip the handle 224 of the tray 220 and then move the tray 220 in a sliding manner, whereby the tray 220 can be mounted on the case 210 or isolated from the case 210, or a part of the tray 220 may be exposed. Meanwhile, the user may arrange the plural capsules 100 on the plural capsule accommodation parts 221-1 of the tray 220 while exposing a part of the tray 220.

The upper plate 221 of the tray 220 may include: a plurality of ridges 225 that corresponds to a plurality of columns, on which the plural accommodation parts 221-1 are disposed, one to one; and a plurality of troughs 226 caved and disposed between the ridges 225.

Each of the ridges 225 may be formed along at least a part of the periphery of the corresponding one of the plural capsule accommodation parts 221-1. Therefore, as compared to the troughs 226, the capsule accommodation parts 221-1 may have a relatively higher height with respect to the vertical direction.

Further, each of the ridges 225 may include an inclined part 225-1 which is inclined upward to the corresponding one of the plurality of columns, on which the plural capsule accommodation parts 221-1 are disposed. In this regard, the inclined part 225-1 may include a first inclined portion 225-2 and a second inclined portion 225-3 that extend along the corresponding one of the plurality of rows, on which the plural capsule accommodation parts 221-1 are disposed, and are arranged in parallel to each other.

The inclined parts 225-1 of the ridges 225 may reflect light emitted from the light source module 230 toward neighboring capsule accommodation parts 221-1, thereby performing a function of improving light efficiency.

The culture medium injection unit 227 may include a plurality of injection pipes 227-1, connection pipes 227-2 and connection ports 227-3.

The plural injection pipes 227-1 may be disposed on the bottom surface of the upper plate 221 of the tray 220. Specifically, the injection pipes 227-1 may be disposed in close contact with the bottom surface of the upper plate 221 of the tray 220.

The plural injection pipes 227-1 may be arranged in one-to-one correspondence with the plurality of rows (otherwise, according to design conditions in a modified example, the plural injection pipes may be arranged in one-to-one correspondence with the plurality of columns). Further, a plurality of injection nozzles to inject the culture medium toward the side openings of the plural capsules 100 may also be provided. In this case, the injection nozzles may be arranged along a plurality of rows (in a modified example, a plurality of columns) on which the plural injection pipes 227-1 are disposed.

Meanwhile, with regard to the plant cultivation device 200 of the present invention, since the side opening portions of the plural capsules 110 are a starting point where roots of the plants are growing, the culture medium may be fed to all parts of root of the plant by arrangement of the plural injection pipes 227-1 and an injection direction thereof. Moreover, the plant cultivation device 200 of the present invention may prevent the supply of the culture medium from being interrupted by the roots of neighboring plants.

A plurality of rows (a plurality of columns in the modified example) on which the plural injection pipes 227-1 are disposed, and a plurality of rows (a plurality of columns in the modified example) on which the plural capsule accommodation parts 221-1 are disposed may not overlap with each other with respect to the vertical direction. In other words, the plurality of rows (the plurality of columns in the modified exampled) on which the plural injection pipes 227-1 are disposed may be approximately arranged between the plurality of rows (the plurality of columns in the modified example) on which the plural capsule accommodation parts 221-1 are arranged. As a result, one of the injection pipes 227-1 may be sandwiched between two of the plural capsule accommodation parts 221-1, and therefore, may be disposed adjacent to the above two capsule accommodation parts.

In this regard, according to the plant cultivation device 200, in order to uniformly supply the culture medium to the roots of all the plants, the plurality of injection nozzles may include: a first injection nozzle to inject the culture medium to the adjacent capsule accommodation parts at one side among the plural capsule accommodation parts 221-1; and a second injection nozzle to inject the culture medium to the adjacent capsule accommodation parts at the other side among the plural capsule accommodation parts 221-1, wherein the first injection nozzle and the second injection nozzle may be provided in pairs.

The connection pipe 227-2 may be connected to the plural injection pipes 227-1 at one side while being connected to the feed channel 223-1 at the other side thereof. The connection pipe 227-2 may connect the plural injection pipes 227-1 and the feed channel 223-1 so as to provide a flow path through which the culture medium in the culture medium module 250 can move to the plural injection pipes 227-1. On the other hand, a single connection pipe 227-2 may be provided and integrated with the plural injection pipes 227-1. That is, the connection pipe 227-2 may be branched to form the plural injection pipes 227-1.

The connection port 227-3 is arranged in perpendicular to the connection pipe 227-2 while the feed channel 223-1 is disposed above the same, whereby the connection port 227-3 may be connected to the flow path of the feed channel 223-1 in a vertical direction. For this purpose, the feed channel 223-1 may have a structure curved or bent at a right angle. For example, the connection port 227-3 may extend downward from the connection pipe 227-2, the feed channel 223-1 may include a main body and a docking part curved upward from the main body of the feed channel 223-1, and the connection port 227-3 may be docked on the docking part of the feed channel 223-1 so as to be pressed downward. As a result, the connection port 227-3 and the feed channel 223-1 may be securely and tightly fastened to prevent leakage of the culture medium.

The light source module 230 may be a module for determining an illumination environment of the cultivation space s1. That is, the light source module 230 may determine an illumination of the cultivation space s1. Specifically, the light source module 230 may emit light in the cultivation space s1. For example, the light emitted from the light source module 230 may be incident on a lateral side of the cultivation space s1 and the upper plate 221 of the tray 220 or the like.

The light source module 230 may be provided in plural. The number of the light source modules 230 may be the same as the number of the cultivation spaces s1. That is, the plural light source modules 230 and the plural cultivation spaces s1 may correspond one to one so that one light source module 230 may be disposed in each cultivation space s1.

The light source module 230 may be disposed at a ceiling surface (upper portion) of the cultivation space s1. Further, the light source module 230 may include a substrate 231 and a plurality of lamps 232 mounted on the substrate of the light source module 230. In this regard, the substrate 231 of the light source module 230 may be a printed circuit board (PCB), and the plurality of lamps 232 may be a light emitting diode (LED) array.

On the other hand, a wavelength band of the light emitted from the plural lamps 232 may be a white wavelength band, a red wavelength band or a blue wavelength band. In order to implement the wavelength band of natural light, among the plural lamps, a ratio of lamps having the white wavelength band is the highest, a ratio of lamps having the red wavelength band is the next highest, and a ratio of lamps having the blue wavelength band is the lowest.

The plural lamps 232 may be grouped into a plurality of lamp groups for zoning control of the plural capsule accommodation parts 221-1 of the tray 220 or for control under glare occurring conditions. In this regard, the plural lamps 232 may be grouped into one or more numbers. That is, only one lamp 232 may be included in a lamp group, or multiple lamps 232 may form one lamp group.

The plural lamps 232 may be grouped in different manners. For example, with regard to the plural lamps 232, the lamps having the same mutually-facing capsule accommodation parts among the plural capsule accommodation parts may undergo grouping. That is, the plural capsule accommodation parts 221-1 and the plural lamp groups 221-1 may be matched one-to-one (see FIG. 8(1), zoning control in terms of one capsule accommodation part as a basic unit).

Further, with regard to the plural lamps 232, the lamps having the mutually-facing capsule accommodation parts, which are disposed on the same row, among the plural capsule accommodation parts 221-1, may undergo grouping. That is, a plurality of rows, on which the plural capsule accommodation parts 221-1 are disposed, and the plural lamp groups may be matched one-to-one (see FIG. 8(2), zoning control in terms of one row as a basic unit).

Further, with regard to the plural lamps 232, the lamps having the mutually-facing capsule accommodation parts, which are disposed on the same column, among the plural capsule accommodation parts 221-1, may undergo grouping. That is, a plurality of columns, on which the plural capsule accommodation parts 221-1 are disposed, and the plural lamp groups may be matched one-to-one (see FIG. 8(3), zoning control in terms of one column as a basic unit).

Further, the plural lamps 232 may be grouped into a plurality of lamp groups according to the wavelength band. In this regard, the plurality of lamp groups may include a first lamp group to emit light in a white wavelength band, a second lamp group to emit light in a red wavelength band, and a third lamp group to emit light in a blue wavelength band (for control on the basis of the wavelength band under glare occurring condition)

The plurality of lamp groups may be independently controlled by a control module (not shown). As described above, the plural lamps 232 may be grouped into a plurality of lamp groups (matching with the lamps at the capsule accommodation part) with reference to the plural capsule accommodation parts 221-1, so that the plural capsule accommodation parts 221-1 are divided into a plurality of zones, and the illumination environment of each of the plural zones may be independently controlled by a specific lamp group matching therewith (zoning control). Further, the plural lamps 232 may be grouped on the basis of wavelength bands, and only a lamp group to emit light in a wavelength band that is harmful to the user's eye under glare conditions may be selectively controlled.

The camera module 240 may be a module for photographing the cultivation space s1 in order to generate a "photographed image". Specifically, the camera module 240 may be a module that photographs the plural capsule accommodation parts 221-1 and generates a "photographed image". The "photographed image" in the camera module 240 may be displayed on the user device 300 whereby the user can monitor a cultivation process. To this end, the camera module 240 may wirelessly communicate with the user device 300.

Further, the "photographed image" in the camera module 240 may be analyzed and treated in the control module (not shown), thereby being processed into "plant cultivation information". For example, the control module may analyze the "photographed image" in the camera module 240 in order to calculate a leaf area of the plant grown in each of the plural capsules 100, thereby producing "plant growth information".

The camera module 240 may be disposed on the ceiling of the cultivation space s1. In this regard, the camera module 240 may be mounted on the substrate 231 of the light source module 230. The camera module may be provided in plural. The number of the camera modules 240 may be the same as the number of the cultivation spaces s1. That is, the plural camera modules 240 and the plural cultivation spaces s1 may correspond one to one, and one camera module may be disposed in each of the cultivation spaces s1.

The culture medium module 250 may be a module for supplying the culture medium to the culture medium chamber c of the tray 220. The culture medium module 250 may include a water tank 251, a nutrient solution tank 252, a culture medium tank 253, a water line 254 and a refill port 255.

The water tank 251 may be disposed in a second space s4 of the case 210 at a portion corresponding to the cultivation space s1. The water tank 251 may be a tank where water is stored. The water in the water tank 251 may be supplied to the culture medium tank 253. The water tank 251 may be provided with a first water level sensor 251-1 to sense a water level of the water tank 251. The first water level sensor 251-1 may sense a level of water in the water tank 251 and may alarm to inform the user when the water level is lower than a reference value. As a result, the user can check an amount of water stored in the water tank 251 in real time and, when the remaining amount of water stored in the water tank 251 is less than the reference value, water is further supplied to the water tank 251 through the refill port. On the other hand, the water tank 251 may be located above the nutrient solution tank 252. That is, a vertical phase (or position) of the water tank 251 may be higher than the nutrient solution tank 252.

The nutrient solution tank 252 may be disposed in the second space s4 of the case 210 at a portion corresponding to the cultivation space s1. The nutrient solution tank 252 may be a tank in which the nutrient solution is stored. The nutrient solution in the nutrient solution tank 252 may be supplied to the culture medium tank 252. The nutrient solution tank 252 may be provided with a second level sensor 252-1 to sense a level of nutrient solution in the nutrient solution tank 252. Specifically, the second level sensor 252-1 may sense the level of nutrient solution contained in the nutrient solution tank 252 and may alarm to inform the user when the level of the nutrient solution is lower than a reference value. As a result, the user can check an amount of the nutrient solution stored in the nutrient solution tank 252 in real time. If the residual amount of the nutrient solution stored in the nutrient solution tank 252 is less than the reference value, the user can further fill the nutrient solution tank 252 with the nutrient solution through the refill port 255 (refill). On the other hand, the nutrient solution tank 252 may be located below the water tank 251. That is, a vertical phase of the nutrient solution tank 252 may be lower than the water tank 251.

Meanwhile, according to a modified embodiment of the present invention, the nutrient solution tank 252 may be manufactured in a replaceable cartridge type (not shown). Therefore, the user can replace the nutrient solution tank 252 when the residual amount of the nutrient solution stored in the nutrient solution tank 252 is less than a reference value or the nutrient solution is exhausted.

Further, the nutrient solution tank 252 may be provided in plural depending on the kinds of the nutrient solution. For example, two nutrient solution tanks 252 may be provided in order to separately store a first nutrient solution and a second nutrient solution, which contain different components respectively. Further, the first nutrient solution and the second nutrient solution of the two nutrient solution tanks 252 may be supplied to the culture medium tank 253 (supplied independently without mixing together). Further, a second level sensor 252-1 may be provided in each of the two nutrient solution tanks 252, respectively.

The culture medium tank 253 may be disposed in the second space s4 of the case 210 at a portion corresponding to the additional space s2. The culture medium tank 253 may be a tank in which the culture medium is stored. In the culture medium tank 253, the water fed from the water tank 251 and the nutrient solution fed from the nutrient solution tank 252 may be mixed together to form the culture medium.

The culture medium of the culture medium tank 253 may be supplied to the culture medium chamber c of the tray 220 in order to provide moisture and nutrients to the plant under cultivation. Further, the culture medium of the culture medium chamber c may be discharged to the culture medium tank 253. That is, the culture medium circulates in the culture medium tank 253 and the culture medium chamber c, whereby some of the culture medium may be absorbed into the plant. However, the present invention is not limited to the above configuration, and at least a portion of the culture medium in the culture medium chamber c may be discharged to the outside.

A third level sensor 253-1 may be disposed in the culture medium tank 253 in order to sense a level of the culture medium in the culture medium tank 253. The third level sensor 253-1 may sense the level of the culture medium in the culture medium tank 253 and may transmit an alarm signal to the control module (not shown) if a level of the culture medium is less than the reference value. As a result, when the residual amount of the culture medium stored in the culture medium tank 253 is less than the reference value, water may be fed from the water tank 251 and the nutrient solution may be fed from the nutrient solution tank 252.

The culture medium tank 253 may be provided with a concentration sensor 253-2 and a temperature sensor 253-3 whereby the concentration and temperature of the culture medium can be sensed. Therefore, according to the present invention, if the residual amount of the culture medium is less than the reference value, the control module may receive alarm signals, and then, firstly control the culture medium module 250 so as to supply water of the water tank 251 to the culture medium tank 253, followed by controlling the supply of the nutrient solution of the nutrient solution tank 252 to the culture medium tank 253 until the concentration of the culture medium satisfies the reference value. Controlling the residual amount and the concentration of the culture medium may be automatically performed by the control module.

Further, when the temperature of the culture medium is different from a reference value, the temperature of the culture medium may be adjusted to the reference value. To this end, a separate temperature control device (not shown) may be provided.

The water line 254 may be a flow path for water, the nutrient solution and the culture medium. Specifically, the water line 254 may include a first water line 254-1, a second water line 254-2, a third water line 254-3 and a fourth water line 254-4.

The first water line 254-1 may be a line to connect the water tank 251 and the culture medium tank 253. Water stored in the water tank 251 may be supplied to the culture medium tank 253 through the first water line 254-1.

The water tank 251 may be located at a position higher than the culture medium tank 253. As a result, the water in the water tank 251 may be supplied to the culture medium tank 253 by potential energy of the water stored in the water tank 251 without requiring any additional power. A first valve 256-1 may exist in the first water line 254-1 to control a flow rate of water fed from the water tank 251 to the culture medium tank 253. In this case, the first valve 256-1 is a solenoid valve and may be electronically controlled by the control module.

The second water line 254-2 may be a line to connect the nutrient solution tank 252 and the culture medium tank 253. The nutrient solution of the nutrient solution tank may be supplied to the culture medium tank 253 through the second water line 254-2. The second water line 254-2 may be provided with an electronic flow rate control device 256-2 which is electronically controlled by the control module, whereby the flow rate of the nutrient solution fed from the nutrient solution tank 252 to the culture medium tank 253 can be precisely controlled. Moreover, the second water line 254-2 may also have a second valve 256-3 in addition to the flow rate control device 256-2, thereby securely preventing excess nutrient solution of the flow control device 256-2 from being supplied to the nutrient solution tank 252. In this case, the second valve 256-3 is a solenoid valve and can be electronically controlled by the control module.

The third water line 254-3 may be a line to connect the culture medium tank 253 and the culture medium chamber c of the tray 220. The culture medium in the culture medium tank 253 may be supplied to the culture medium chamber c through the third water line 254-3. Therefore, the third water line 254-3 may be referred to as a "culture medium feed line".

The third water line 254-3 may include a filter 256-4, a pump 256-5 and a third valve 256-6, which are arranged in sequential order in a direction of feeding the culture medium. In this regard, the filter 256-4 and the pump 256-5 may be disposed in the second space s4 of the case 210 at a portion corresponding to the additional space s2. That is, since the additional space s2 of the case 210 has a shorter length than that of the cultivation space of the case 210, a portion of the second space s4 corresponding to the additional space s2 may be longer than a whole length of the portion corresponding to the cultivation space s1 in the second space s4 of the case 210.

Therefore, in consideration of characteristics of products, the culture medium tank 253, the filter 256-4 and the pump 256-5, which are to be disposed in a space at a long whole length, may be provided in the second space s4 of the case 210 at a portion corresponding to the additional space s2.

The filter 256-4 may filter the foreign substance in the culture medium supplied to the culture medium chamber c, thereby preventing the foreign substance from accumulating in the culture medium chamber c.

In the third water line 254-3, the culture medium in the culture medium tank 253 may move to the culture medium chamber c by the power of the pump 256-5. On the other hand, a vertical phase of the culture medium tank 253 may be higher than that of the filter 256-4. As a result, due to a difference in potential energies, excess water may always be stored in the filter 256-4 and this excess water in the filter 256-4 may enter the pump 256-5 by the power of the pump, thereby preventing the pump 256-5 from idling without the culture medium to cause a mechanical trouble.

Meanwhile, when a plurality of trays 220 is provided, the third water line 254-3 may be branched or exist in plural to supply the culture medium to the plural trays 220.

To this end, the third water line 254-3 may be branched in plural to supply the culture medium to each of the plural trays 220, wherein a third valve 256-6 may be disposed at a branched point of the third water line 254-3. In this case, the third valve 256-6 is a solenoid valve and may be electronically controlled by the control module. Moreover, the control module may control the third valve 256-6 in order to independently and sequentially supply the culture medium to the plural trays 220.

The third water line 254-3 may be used as a flow path for supplying the culture medium to the culture medium chamber c of the tray 220 while being connected to the feed chamber 223-1 of the tray 220.

The fourth water line 254-4 may be a line to connect the culture medium tank 253 and the culture medium chamber c of the tray 220. The culture medium in the culture medium chamber c may be discharged to the culture medium tank 253 through the fourth water line 254-4. Therefore, the fourth water line 254-4 may be referred to as a "culture medium discharge line".

The fourth water line 254-4 may be connected to the discharge channel 223-2 of the tray 220 and used as a flow path for discharging the culture medium in the culture medium chamber c of the tray 220.

The culture medium chamber c of the tray 220 may be located at a higher position than the culture medium tank 253. Therefore, the culture medium in the culture medium chamber c may be discharged to the culture medium tank 253 by potential energy of the culture medium stored in the culture medium chamber c without requiring additional power.

On the other hand, when a plurality of trays 220 is provided in plural, the fourth water line 254-4 may be branched or exist in plural so as to discharge the culture medium from each of the plural trays 220.

As described above, the culture medium may be fed from the culture medium tank 253 to the culture medium chamber c of the tray 220 through the third water line 254-3 and may be discharged from the culture medium chamber c of the tray 220 to the culture medium tank 253 through the fourth water line 254-4, whereby the culture medium can circulate between the culture medium tank 253 and the culture medium chamber c.

Meanwhile, at least a portion of the culture medium in the culture medium chamber c may be discharged to the outside. In the case where only a portion of the culture medium is discharged to the outside, a separate drain line may be further provided. On the contrary, if all of the culture medium is discharged to the outside, the fourth water line 254-4 may be connected to the outside in order to perform the same function as the drain line.

The refill port 255 may be a port through which water and the culture medium are refilled. The refill port 255 may be located in the first space s3 of the case 210. The refill port 255 may include: a first refill channel 255-1 into which water flows; a second refill channel 255-2 into which the culture medium flows; and a feed line 255-3 to connect the first refill channel 255-1 and the water tank 2 while connecting the second refill channel 255-2 and the nutrient solution tank 252. On the other hand, a plurality of second refill channels 255-2 may be provided in one-to-one correspondence within the plural nutrient solution tanks 252.

The air conditioning module 260 may supply external air to the cultivation space s1. Further, the air conditioning module 260 may change a temperature and/or humidity of the gas in the cultivation space s1. The air conditioning module 260 may include a compressor 261, a first heat exchanger 262, a second heat exchanger 263, a blower 264 and an air conditioning line 265.

A coolant (or refrigerant) may circulate throughout the compressor 261, the first heat exchanger 262 and the second heat exchanger 263, and the gas in the cultivation space s1 may circulate in the cultivation space s1 and the second heat exchanger 263 by a blowing power of the blower 264. Further, the external air is supplied to the cultivation space s1 through the second heat exchanger 263 by the blowing power of the blower 264, so as to form at least a portion of the gas in the cultivation space s1.

The compressor 261 may be a device for compressing gaseous refrigerant at high temperature and high pressure. The first heat exchanger 262 may be a device that condenses the gaseous refrigerant into low-temperature and high-pressure refrigerant in a liquid state by heat exchange (heat radiation) between the refrigerant compressed at high temperature and high pressure and the external air. Therefore, the first heat exchanger 262 may be referred to as a "condenser". The second heat exchanger 263 may be a device for heating the liquid refrigerant condensed in the condenser to become a gaseous state. Therefore, the second heat exchanger 263 may be referred to as an "evaporator". Further, the gas in the cultivation space s1 and the external air may undergo heat exchange (cooling) along with the evaporating refrigerant in the second heat exchanger 263 to be cooled. As a result, the temperature and/or humidity of the gas in the cultivation space s1 may be changed in a heat exchange process in the second heat exchanger 263.

The air conditioning line 265 may be a flow path through which the refrigerant, the gas in the cultivation space s1 and the external air flow. The air conditioning line 265 may include a first air conditioning line 265-1, a second air conditioning line 265-2 and a third air conditioning line 265-3.

The first air conditioning line 265-1 may be a line to circulate the refrigerant. The refrigerant may depart the compressor 261, pass the first heat exchanger 262 and the second heat exchanger in order, and then return to compressor 261, thereby completing a circulation. For this purpose, the first air conditioning line 265-1 may connect the compressor 261 and the first heat exchanger 262 and further connect the first heat exchanger 262 and the second heat exchanger 263.

The second air conditioning line 265-2 may be a line for supplying the external air into the cultivation space s1 or for recycling the gas in the cultivation space s1 back to the same. Meanwhile, the external air introduced into the cultivation space s1 may form at least a portion of the gas in the cultivation space s1. Further, the external air and the gas in the cultivation space s1 may be fed to the cultivation space s1 via the second heat exchanger 263. In this regard, the gas returned to the cultivation space s1 as well as the external air may undergo heat exchange with the refrigerant, thereby altering the temperature and/or the humidity of the gas in the cultivation space s1.

To this end, the second air conditioning line 265-2 may connect the cultivation space s1 and the blower 264. Specifically, the external air may be fed to the cultivation space s1 by the power of the blower 265 along the second air conditioning line 265-2, and the gas in the cultivation space s1 may be supplied again (or returned) to the cultivation space s1. Further, the second heat exchanger 263 may be disposed in the second air conditioning line 265-2

On the other hand, when a plurality of cultivation spaces s1 is provided, the second air conditioning line 265-2 may be branched or exist in plural so as to supply the external air to the plural cultivation spaces s1, respectively, or so as to return the gas in the plural cultivation spaces s1 to the same.

The third air conditioning line 265-3 may be a line through which the gas in the cultivation space s1 is discharged. Meanwhile, the gas in the cultivation space s1 discharged through the third air conditioning line 265-3 may be discharged to the outside or introduced again into the cultivation spaces s1 through the second air conditioning line 265-2. That is, at least a portion of the gas in the cultivation space s1 may be discharged from the cultivation space s1 and then returned to the cultivation space s1, thereby performing circulation.

To this end, the third air conditioning line 265-3 may connect the cultivation space s1 and the blower 264. Specifically, the gas in the cultivation space s1 may be discharged to the outside through an open portion of the blower 264 or the gas in the cultivation space s1 may be re-fed to the cultivation space s1 by the power of the blower 264.

On the other hand, when a plurality of cultivation spaces s1 is provided, the third air conditioning line 265-3 may be branched or exist in plural to discharge the gas in the plural cultivation spaces s1, respectively.

The sensor module 270 may be a module to sense the plural capsules 100 and generate "sensing information". In this regard, the "sensing information" may include "species information" for species of each of the plural capsules 100, as well as "accommodation information" for states of the plural capsule accommodation parts 221-1.

For this purpose, the sensor module 270 may be provided with various means for recognizing the plural capsules 100. For example, when radio frequency identification (RFID) method is used as a wireless recognition method for a plurality of capsules 100, the sensor module 270 may be a "reader" for recognizing the recognition unit 120 of the capsule 100.

In this regard, the sensor module 270 may include: an "integrated circuit (IC) chip" for receiving the "sensing information"" of the capsule 100; a "wireless communication unit" for wireless communication with the user device 330 and/or the server 400; and a printed circuit board (PCB) on which the "IC chip" and the "wireless communication unit" are mounted. The PCB may be a flexible printed circuit board (FPCB).

Further, a variety of sensing methods may be used for recognition of the capsule 100. For example, there is a method of recognizing inherent magnetic field generated by the capsule 100 using a hall sensor. In this case, the sensor module 270 may include: a hall sensor for sensing a magnetic field generated in the recognition unit 120 of the capsule 100; a "wireless communication unit (e.g., an antenna)" for wireless communication with the user device 300 and/or the server 400; and a printed circuit board (PCB) on which a "Hall IC chip" and the "wireless communication unit" are mounted. The PCB may be a flexible printed circuit board (FPCB).

Meanwhile, the "wireless communication unit" may perform wireless communication with the user device 300 by at least one of Wi-Fi, Li-Fi, Bluetooth, UWB (Ultra-Wide Band), Zigbee and Z-wave modes. Therefore, the "sensing information" of the sensor module 270 can be transmitted to the user device 300.

Further, the sensor module 270 may be electrically connected to the control module (not shown) to perform wired or wireless communication. Therefore, the sensor module 270 can transmit the "sensing information" to the control module.

The sensor module 270 may be disposed on the bottom surface of the upper plate 211 of the tray 220. In this case, the sensor module 270 may be disposed such that it does not overlap with the plural capsule accommodation parts 211-1 in a vertical direction (up and down direction).

The sensor unit 280 may be a member that generates diverse information to determine whether the "glare occurring condition" is established. Further, information generated by the sensor unit 280 may be transmitted to the control module (not shown) and the control unit may use this information (generated by the sensor unit 280) in order to determine whether the "glare occurring condition" is established. In this case, the "glare occurring condition" may mean a condition in which the user feels glare or the user's eyes are damaged by the light emitted from the light source module 230.

Further, the "glare occurring condition" may include: a "first glare occurring condition" in which the user approaches the door 212 of the case 210 (see FIG. 11(1)); a "second glare occurring condition" in which the user contacts the door 212 of the case 210 (see FIG. 11(2)); and a "third glare occurring condition" in which the door 212 of the case 210 is opened (see FIG. 11(3)). Herein, the situation where the user approaches the door 212 of the case 210 is not limited to a situation where the user moves toward the door 212 of the case 210, and would be determined as a concept including a situation where the user is stopped and located near the door 212 of the case 210 (within a predetermined radial range with respect to the door of the case). Further, the situation where the user contacts the door 212 of the case 210 may include, for example, a situation where the user grips a handle of the door 212 of the case 210 in order to open the door 212 of the case 210, without limitation thereto. In addition, the situation where the door 212 of the case 2100 is opened may include a situation where the door 212 of the case 210 is pulled and opened by the user, and may also be determined as a concept including a situation where the door is opened by other naturally occurring external force.

Meanwhile, the sensor unit 280 may include: a first sensor unit 281 for generating various information to determine whether the "first glare occurring condition" is established; a second sensor unit 282 for generating various information to determine whether the "second glare occurring condition" is established; and a third sensor unit 283 for generating various information to determine whether the "third glare occurring condition" is established.

The first sensor unit 281 may be disposed on the upper left side of a front surface of the door 212 of the case 210. Different sensors may be used for the first sensor unit 281. For example, the first sensor unit 281 may be an infrared sensor to sense a location of the user, but not being limited thereto. When the first sensor unit 281 is the infrared sensor, the first sensor unit 281 may sense the location of the user and generate "user location information".

The second sensor unit 282 may be disposed on the handle of the door 212 of the case 210. Different sensors may be used for the second sensor unit 232. For example, the second sensor unit 282 may be a contact type load sensor to determine application of pressure, but not being limited thereto. When the second sensor unit 282 is a load sensor, the second sensor unit 282 may sense pressure applied to the door 212 of the case 210 (the pressure generated when the user grips the handle of the door of the case), and then generate "door pressure information".

The third sensor unit 283 may be disposed on a lateral side of the door 212 of the case 210. Different sensors may be used for the third sensor unit 283. For example, the third sensor unit 283 may be an acceleration sensor to sense a direction and speed of motion of an object, but not being limited thereto. In fact, various sensors including a gyro sensor for determining the posture of an object may also be used as the third sensor unit 283. When the third sensor unit 283 is an acceleration sensor, the third sensor unit 283 may sense the direction and speed of motion of the door 212 of the case 210 when the door 212 of the case 210 is opened, and then, generate "door motion information".

The plant cultivation device 200 may be operated in the "automatic control mode" and the "customizing control mode". The "automatic control mode" may be an operation mode for controlling the light source module 230, the culture medium module 250 and the air conditioning module 260 according to the "sensing information" in the control module, while the "customizing control mode" may be an operation mode in which the user can set control values in regard to the light source module 230, the culture medium module 250 and the air conditioning module 260 using the user device 300 or the like, whereby the light source module 230, the culture medium module 250 and the air conditioning module 260 can be controlled by the same.

The control module (not shown) may be a module that receives the "sensing information" from the sensor module 270 and controls the plant cultivation device 200. The control module may control the light source module 230, the culture medium module 250 and the air conditioning module 260 using the "sensing information".

In other words, the control module may use "species information" for species of the plural capsules 100 and "accommodation information" for states of the plural capsule accommodation parts 221-1 (active or inactive state, arrangement of the plural capsules 100 in the plural capsule accommodation parts) in order to control the light source module 230, the culture medium module 250 and the air conditioning module 260.

The control module may control the light source module 230 according to the "species information" so as to change illumination of the cultivation space s1 (illumination intensity control). That is, the plant cultivation device 200 of the present invention may change the illumination environment by reflecting different and various species in the plural capsules 100. For example, the control module may control the light source module 230 using the "species information" such that an illumination value of the cultivation space s1 becomes an average of desirable illumination values of the plural capsules 100. In this case, the desirable value of each capsule 100 differs depending on species of each of the plural capsules 100, and may be a predetermined illumination value for the plants to desirably grow under photosynthesis action.

Further, the control module may control the light source module 230 according to the "accommodation information", thereby independently controlling a plurality of lamp groups in the light source module 230 (illumination zoning control). That is, the control module may turn on one or more lamp groups corresponding to the capsule accommodation part in an active state (the capsule accommodation part on which at least one capsule is accommodated) among the plural lamp groups, while turning off at least one lamp group corresponding to the capsule accommodation part in an inactive state (the capsule accommodation part on which at least one capsule is not accommodated) among the plural lamp groups.

Further, the control module may control the light source module 230 by reflecting the change of natural light (illumination dimming control). As shown in FIG. 9, the illumination of natural light is changed over time during the day (sunrise and sunset of the sun), with a first section in which illumination increases sharply, a second section in which illumination is slightly changed, a third section in which illumination decreases sharply, and a fourth section in which illumination becomes zero (0). Further, a variation in illumination due to natural light differs slightly depending on the season, however, may involve the first section, the second section, the third section and the fourth section as described above on average. Further, the third section may be divided into a 3-1 section in which the illumination sharply decreases and a 3-2 section in which the illumination gradually decreases.

According to the present invention, the light source module 230 may be controlled to respond to a change of natural light, thereby realizing a light environment similar to the natural environment.

For instance, as shown in FIG. 10, the control module may control the light source module 230 such that the light module sequentially changes light in a first dimming mode, a second dimming mode, a third dimming mode and a fourth dimming mode at a predetermined cycle. In this case, the first dimming mode, the second dimming mode, the third dimming mode and the fourth dimming mode may be repeatedly changed in sequential order in a cycle of one day.

Herein, the first dimming mode may be a mode in which the first section of natural light is inferred and applied. Likewise, the second dimming mode may be a mode in which the second section of natural light is inferred and applied, the third dimming mode may be a mode in which the third section of natural light is inferred and applied, and the fourth dimming mode may be a mode in which the fourth section of natural light is inferred and applied.

Meanwhile, there are various aspects in optical design. Although each section of the natural light may not be perfectly matched to each of the dimming modes due to simplification of the illumination control, the first to fourth dimming modes satisfy the following conditions, thereby embodying an illumination environment similar to the natural light.

Illumination of the cultivation space s1 may increase in the first dimming mode, while being decreased in the third dimming mode. Further, an average value of variation in illumination of the cultivation space s1 in the second dimming mode ("second average value") and an average value of variation in illumination of the cultivation space s1 in the fourth dimming mode ("fourth average value") may be smaller than an average value of variation in illumination of the cultivation space s1 in the first dimming mode ("first average value") and an average value of variation in illumination of the cultivation space s1 in the third dimming mode ("third average value"). Herein, the variation in illumination may mean an absolute value of illumination changed in unit time.

In other words, the first dimming mode may sharply increase the illumination of the cultivation space s1 to correspond to the first section, while the third dimming mode may sharply decrease the illumination of the cultivation space s1 to correspond to the third section. As a result, the variation in illumination of the cultivation space s1 in both the first dimming mode and the third dimming mode is dominant, whereas the variation in illumination of the cultivation space s1 in the second dimming mode and the fourth dimming mode may be relatively insignificant.

Further, a time required for the first dimming mode may be 30 minutes or longer and 2 hours or shorter. Further, a time required for the third dimming mode may be 1 hour or longer and 5 hours or shorter.

Further, as shown in FIG. 10(1), the illumination of the cultivation space s1 may be substantially maintained constant in the second dimming mode, and the light source module 230 is turned off in the fourth dimming mode so that the illumination of the cultivation space s1 may become zero (0).

Further, as shown in FIG. 10(2), the time required for the first dimming mode may be shorter than that for the third dimming mode since the time required for the first section of natural light is shorter than that for the third section of natural light.

In addition, as shown in FIG. 10(3), the illumination of the cultivation space s1 may increase even in the second dimming mode. However, as described above, the second average value of variation in illumination of the cultivation space s1 in the second dimming mode may be smaller than the first average value of variation in illumination of the cultivation space s1 in the first dimming mode and the third average value of variation in illumination of the cultivation space s1 in the third dimming mode.

Further, as shown in FIG. 10(4), in consideration of the 3-1 section and 3-2 section of natural light, the third dimming mode may be divided into a 3-1 dimming mode in which the illumination of the cultivation space s1 sharply decreases, and a 3-2 dimming mode in which illumination of the illumination of the cultivation gradually decreases. That is, a variation in illumination of the cultivation space s1 in the 3-1 dimming mode may be greater than a variation in illumination of the cultivation space s1 in the 3-2 dimming mode. In this case, the 3-1 dimming mode may be performed before the 3-2 dimming mode.

The control module may control the culture medium module 250 according to the "species information" so as to change a concentration of the culture medium supplied to the culture medium chamber c of the tray 220 (concentration control). Specifically, the plant cultivation device 200 of the present invention may vary the water environment by reflecting various and different species of the plural capsules 100. For example, the control module may use the "species information" and control the culture medium module 250 such that the concentration of the culture medium fed to the culture medium chamber c of the tray 200 becomes an average of desirable concentrations of the culture media in the plural capsules 100. In this regard, the desirable concentration of the culture medium in each of the plural capsules 100 differs depending on species of the plural capsules 100 and may be a concentration of the culture medium determined to allow the plant to fully absorb water and nutrients of the culture medium and thus perfectly grow up.

Further, the control module may control the culture medium module 250 according to the "species information" so as to change a feed cycle of the culture medium supplied to the culture medium chamber c of the tray 220 (cycle control). Specifically, the plant cultivation device 200 of the present invention may change the water environment by reflecting various and different species of the plural capsules 100. For example, the control module may use the "species information" and control the culture medium module 250 such that a feed cycle of the culture medium supplied to the culture medium chamber c of the tray 220 becomes an average value of desirable feed cycles of the culture media in the plural capsules 100. In this case, the desirable feed cycle of the culture medium in each of the plural capsules 100 differs depending on species of the plural capsules 100 and may be a feed cycle of the culture medium determined to allow the plant to fully absorb water and nutrients of the culture medium and thus perfectly grow up.

Further, the control module may control the culture medium module 250 according to the "species information" so as to change a feed amount of the culture medium supplied to the culture medium chamber c of the tray 220 (feed amount control). Specifically, the plant cultivation device 200 of the present invention may change the water environment by reflecting various and different species of the plural capsules 100. For example, the control module may use the "species information" and control the culture medium module 250 such that a feed amount of the culture medium supplied to the culture medium chamber c of the tray 220 becomes an average value of desirable feed amounts of the culture media in the plural capsules 100. In this case, the desirable feed amount of the culture medium in each of the plural capsules 100 differs depending on species of the plural capsules 100 and may be a feed amount of the culture medium determined to allow the plant to fully absorb water and nutrients of the culture medium and thus perfectly grow up.

Further, the control module may control the air conditioning module 260 according to the "species information" so as to change a temperature and/or humidity of the gas in the cultivation space s1 (control of temperature and/or humidity). Specifically, the plant cultivation device 200 of the present invention may change weather environment by reflecting various and different species of the plural capsules 100. For example, the control module may use the "species information" and control the air conditioning module 250 such that a temperature and/or humidity of the gas in the cultivation space s1 becomes an average value of desirable temperature and/or humidity of the plural capsules 100. In this case, the desirable temperature and/or humidity of each of the plural capsules 100 differs depending on species of the plural capsules 100 and may be a temperature and/or humidity of air determined according to weather conditions to allow the plant to perfectly grow up.

Meanwhile, the control module may determine the "glare occurring condition" and control the light source module 23. That is, in order to protect the eyes of a user, the control module may control the light source module 230 such that a light output amount under the condition, in which a glare phenomenon may occur or the user's eyes may be damaged, is lower than that in the normal condition or turned off.

In this regard, the "glare occurring condition" may include: a first glare occurring condition in which the user approaches the door 212 of the case 210 (see FIG. 11(1), a concept including the condition in which the user approaches the door of the case and then stays for a predetermined time); a second glare occurring condition in which the user contacts the door 212 of the case 210 (see FIG. 11(2); and a third glare occurring condition in which the door 212 of the case 210 is opened (see FIG. 11(3)).

In this regard, the "normal condition" may mean a condition in which the "glare occurring condition" does not occur. In the "normal condition", the control module may control the light source module 230 according to the "sensing condition" of the sensor module 270.

In this regard, the "light output amount" may use different definitions of brightness. For example, the "light output amount" may mean a light intensity, luminous flux, luminance of light emitted from the light source module 230, etc.

In the "glare occurring condition", the control module may receive various information from the sensor unit 280 and use the same to determine whether the "glare occurring condition" is established, thereby reducing the light output amount of the light source module 230 or turning off the light source module 230 to control the same.

For example, the control module may receive "user location information" from the first sensor unit 281 and then determine whether the first glare occurring condition is established using the "user location information". Therefore, if the first glare occurring condition is established, the light source module 230 may be controlled such that the light output amount is lower than in the normal condition or turned off.

Further, the control module may receive "door pressure information" from the second sensor unit 282 and then determine whether the second glare occurring condition is established using the "door pressure information". Therefore, if the second glare occurring condition is established, the light source module 230 may be controlled such that the light output amount is lower than in the normal condition or turned off.

Further, the control module may receive "door motion information" from the third sensor unit 283 and then determine whether the third glare occurring condition is established using the "door motion information". Therefore, if the third glare occurring condition is established, the light source module 230 may be controlled such that the light output amount is lower than in the normal condition or turned off.

However, the present invention is not limited to the above configurations, and the control unit may receive diverse information from the sensor unit 280 other than the above described "user location information", "door pressure information" and "door motion information" and use the same in order to determine the "glare occurring condition".

For example, a magnet may be provided in any one of the main body 211 of the case 210 and the door 212 of the case 210, and the other one may be provided with a sensing means for sensing magnetic force of the magnet. That is, the third sensor unit 283 may generate the "door motion information" using the magnetic force.

On the other hand, the control module may independently control the plurality of lamp groups even under the "glare occurring condition". For example, as shown in FIG. 12, under the glare occurring condition, the control module may control the light output amount to be lower than that in the normal condition or turn off the same in regard to only some lamp groups of the plural lamp groups. In this regard, the lamp groups (to be controlled) among the plural lamp groups may be located adjacent to the door 212 of the case 210 than the other lamp groups of the plural lamp groups.

In other words, the control module may control only the lamp groups located in a front direction, which are likely to cause damage to the eyes of the user, among the plural lamp groups, whereby continuity of the illumination environment in the "normal condition" can be maintained by the other lamp groups.

Meanwhile, as described above, the plural lamps 232 may be grouped according to the wavelength band. In this regard, a second lamp group to emit light at a red wavelength band and a third lamp group to emit light at a blue wavelength band may be more harmful to the user's eyes than a first lamp group to emit light at a white wavelength band.

Therefore, under the "glare occurring condition", the control module may control at least one of the second lamp group and the third lamp group to have a lower light output amount than that in the "normal condition" or to be turned off. Further, the control module may control the first lamp group under the "glare occurring condition" to have a lower light output amount than that in the "normal condition", while turning off the second lamp group and the third lamp group, simultaneously.

Meanwhile, the control module may receive the "photographed image" from the camera module 240 and generate "plant growth information". For example, the control module analyzes the "photographed image" of the camera module 240 to calculate a leaf area of the plant grown in each of the plural capsules 100, followed by matching the leaf area of the plant with a plant growth stage using the "species information", whereby the "plant growth information" for each of the plural capsules 100 may be produced. On the other hand, the control module may wirelessly communicate with the user device 300 by the "wireless communication unit" to deliver the "plant growth information" for each of the plural capsules 100. In this case, the "wireless communication unit" of the control module may be separately provided in the control module or, otherwise, the "wireless communication unit" of the sensor module 270 may be utilized as the "wireless communication unit" of the control module.

In this case, the control module may control the light source module 230 according to the "wireless communication unit" (growth illumination control). The purpose of this configuration is to reflect increase in leaf area of the plant as the plant growth progresses. To this end, the control module may independently control a plurality of constitutional lamps (lamps constituting the lamp group) according to the "plant growth information" in each of the plural lamp groups.

For example, among the plural lamps, some lamps having the same mutually-facing capsule accommodation parts among the plural capsule accommodation parts 221-1 are grouped (zoning control in basic unit of one capsule accommodation part). In regard to each of one or more lamp groups among the plural lamp groups, which corresponds to the capsule accommodation part in an active state, when a leaf area of the plant is narrow (initial stage of plant growth), the constitutional lamps adjacent to the center part in a plan view among a plurality of constitutional lamps in each of one or more lamp groups may be turned on, while the constitutional lamps adjacent to the periphery part in the plant view may be turned off (see FIG. 13(1)). On the other hand, when the leaf area of the plant is wide (middle and last stages of growth of the plant in the lamp group), all of the plurality of constitutional lamps in each of one or more lamp groups may be turned on (see FIG. 13(2)).

In addition, the control module may simultaneously perform at least two of "illumination intensity control", "illumination zoning control" and "illumination growth control" of the light source module 230. Specifically, the control module may control the light source module 230 using at least two of "species information", "accommodation information" and "plant growth information" or, otherwise, the control module may use at least one of "species information", "accommodation information" and "plant growth information" and control the light source module 230 such that the first dimming mode, the second dimming mode, the third dimming mode and the fourth dimming mode are sequentially repeated at a predetermined cycle.

For example, the control module may control illumination of the cultivation space s1 (illumination zoning control) corresponding to each of the lamp groups which correspond to the capsule accommodation part in an active state such that the above illumination becomes an average value of desirable illuminations of the plural capsules (illumination intensity control) and, at the same time, may independently control a plurality of constitutional lamps according to "plant growth information" in each lamp group corresponding to the capsule accommodation part in an active state (illumination growth control). Further, the control module may control the light source module 230 such that sequential changes between the first dimming mode, the second dimming mode, the third dimming mode and the fourth dimming mode are repeated at a predetermined cycle (illumination dimming control).

The user device 300 may be a device for communicating with the plant cultivation device 200 to receive "sensing information", "photographed image" and "growth information" from the plant cultivation device 200 or to transmit a "control signal" to the plant cultivation device 200 by the user's operation, thereby controlling the plant cultivation device 200.

The user device 300 may include, but is not limited to, at least one of a telecommunication device such as a smart phone, tablet PC, PDA, laptop computer or the like, or a remote controller.

To this end, the user device 300 may wirelessly communicate with the cameral module 240 of the plant cultivation device 200, with the sensor module 270 of the plant cultivation device 200, and with the control module (not shown) of the plant cultivation device 200. In this regard, at least one of Wi-Fi, Bluetooth, UWB (Ultra Wide Band), Zigbee and Z-wave communication may be used as a communication method.

Meanwhile, the "sensing information", "photographed image", "growth information" and "control signal" may be directly communicated between the user device 300 and the plant cultivation device 200 by near-field communication, otherwise, may be delivered between the user device 300 and the plant cultivation device 200 via the server 400 by long distance communication.

The user device 300 may provide a cultivation information image 310 using the "sensing information", "photographed image" and "growth information". For example, if the user device 300 is a "smartphone", a graphical user interface (GUI) including the cultivation information image 310 may be provided through applications (App) installed in the "smartphone" (App list provided).

Hereinafter, a method for providing cultivation information image 310 through the user device 300 will be described. The method of providing cultivation information may include: receiving at least one of "sensing information", "photographed image" and "growth information" in the user device 300 from the plant cultivation device 200; and using the "sensing information", "photographed image" and "growth information" so as to provide the cultivation information image 310.

The cultivation information image 310 may be converted into a photographing information image 320 or a first-detailed information image 330, and the first-detailed information image 300 may be converted into a second-detailed information image 340 or provide a link to an open market web site 350. The cultivation information image 310, the photographing information image 320, the first-detailed information image 330, the second-detailed information image 340 and the open market web site 350 may be provided in the form of an app list.

The cultivation information image 310 may include a plurality of plant icons 311, a first selection icon 312, a second selection icon 313 and a third selection icon 314, which are displayed in the cultivation information image 310. Further, a thermometer, a hygrometer, a barometer and the like may be disposed in the plant cultivation device 200, and the user device 300 may receive the temperature, humidity and air pressure of the cultivation space s1 transmitted from the plant cultivation device 200. In this case, the temperature, humidity, pressure and the like of the cultivation space s1 may be displayed in the cultivation information image 310 in real time.

A plurality of plant icons 311 may be generated using the "sensing information" and the "growth information". On the other hand, the user device 300 may produce the plurality of plant icons 311 only using the "sensing information".

The plural plant icons 311 may be in one-to-one correspondence with the plural capsule accommodation parts 221-1, respectively. Specifically, the plural plant icons 311 may be arranged to correspond to the plural capsule accommodation parts 211-1. For example, the plural plant icons 311 may be arranged along a plurality of rows and a plurality of columns as with the plural capsule accommodation parts 211-1. On the other hand, the "sensing information (accommodation information)" may be used to represent arrangement of the plural plant icons 311.

Further, the plural plant icons 311 may have an "active state (state in which capsules are accommodated)" and an "inactive state (state in which no capsule is accommodated)" in order to correspond to the state of the plural capsule accommodation parts 221-1.

In this regard, the plant icon having the active state among the plural plant icons 311 may be determined according to at least one of the plant species, the cultivation period and the growth stage. That is, the plant icons in an active state among the plural plant icons 311 may be different in design depending on at least one of plant species, cultivation period and growth stage. Alternatively, among the plural plant icons 311, the plant icons in an inactive state may have the same design.

For example, the plant icon in an active state among the plural plant icons 311 may have different background color, icon shape (the number of leaves, etc.) and icon size depending on the "sensing information (species information, accommodation information) and the "growth information". In this case, the plant species may be determined through the "species information", the cultivation period may be determined through the "accommodation information", and a growth stage may be determined through the "growth information".

Further, in the case where the "growth information" is not utilized, the growth stage may be determined after induction of the species and the cultivation period through the "sensing information (species information, accommodation information)".

Meanwhile, among the plurality of plant icons 311, the plant icon without an active state may have monochromatic background color and various designs such as "EMPTY", etc. and, in case of plural icons, they may have the same design.

The user may select one of the plural trays 220 through the first selection icon 312 (operation, touch, click, etc.). In this case, the cultivation information image 310 may display the plural plant icons 311 corresponding to the tray selected from the plural trays 220 through the first selection icon 312.

In other words, the cultivation information image 310 may be converted to display a plurality of plant icons 311 corresponding to the plural capsule accommodation parts 221-2, which are formed on the tray selected from the plural trays 220 by the first selection icon 312. For example, the user may convert the plural plant icons 311 corresponding to the plural capsule accommodation parts 221-1, which are accommodated on a first tray, into the plural plant icons 311 corresponding to the plural capsule accommodation parts 221-1, which are accommodated on a second tray, through the first selection icon 312 (operation, touch, click, etc.).

The user may convert the cultivation information image 310 into the photographing information image 320 through the second selection icon 313. The photographing information image 320 may be a photographed image of the plural accommodation parts 221-1 obtained by the camera module 240, and the user can receive a live-view image of the cultivation space s1 in real time.

The user may select one of "automatic control mode" and "customizing control mode" as an operation mode of the plant cultivation device 200 through the third selection icon 314.

The user may convert the cultivation information image 310 into the first-detailed information image 330 through the plant icon selected from the plant icons in an active state among the plural plant icons 311 (operation, touch, click, etc.).

In other words, the user may select one of the plant icons in an active state among the plural plant icons 311, thereby intensively acquiring detailed information thereon.

The first detailed information image 330 may display a cultivation grade icon 331, a maturity graph 332, a fourth selection icon 333 and an open market link icon 334, which correspond to the plant icons selected from the plant icons in an active state among the plural plant icons 311.

The cultivation grade icon 331 may be determined using "species information", "accommodation information (inducing a cultivation period)" and "growth information". The cultivation grade may be determined as a growth grade matching with the "growth information" which is given to specific species of plant in unit cultivation period. The user may determine whether the cultivated plant has been matured as a good plant through the cultivation grade icon 331, and therefore, the user may eventually be developed as a cultivating expert by receiving the feedback.

The maturity graph 332 may have the form of a bar ratio graph. In the maturity graph 352, the growth stage may be expressed as a ratio based on the cultivation period.

The user may convert the first detailed information image 333 into the second detailed information image 340 through the fourth selection icon 333 (operation, touch, click, etc.). The second detailed information image 340 may display a cultivation information script 341 corresponding to the plant icon selected from the plant icons in an active state among the plural plant icons 311. The cultivation information script 341 may concretely describe a specification of species, cultivation conditions, and the like, in regard to the plant icon selected from the plant icons in an active state among the plural plant icons 311.

The user may receive a link to the open market web site through the open market link icon 334 (operation, touch, click, etc.). In the Open Magazine web site 350, a capsule containing species corresponding to the selected plant icon of the plant icons in an active state among the plural plant icons 311 may be purchased.

As described above, the method according to an embodiment of the present invention may be implemented as a program (or application) to be executed in combination with a computer as hardware, and then, stored in a medium.

In order for the computer to read the program and execute the methods implemented according to the program, the above-described program may include a code encoded in a computer language such as C, C++, JAVA, machine language, etc., which can be read by a processor of the computer (CPU) through a device interface of the computer. Such code may include a functional code related to a mathematical function or the like that defines necessary functions for executing the above methods, and may further include a control code related to an execution procedure necessary for the computer processor in order to execute the functions in a predetermined procedure. Further, such code may further include a memory reference-related code in regard to any location (address) of internal or external memory of the computer, at which additional information or media required for the computer processor to execute the functions should be referred to. Further, when the computer processor needs to communicate with any other computer or server at a long distance in order to execute the functions, the code may further include communication-related codes, in particular, for determining how to communicate with any other computer or server remotely using the communication module of the computer, what information or media should be transmitted or received during communication, and the like.

The medium to be stored is not a medium for storing data for a short time such as a register, a cache, a memory, etc., but refers to a medium for semi-permanently storing data which is readable by a device. Specifically, the storage medium may include, for example, ROM, RAM, CD-ROM, magnetic tape, floppy disk, optical data storage, and the like, but are not limited thereto. That is, the program may be stored in different recording media on various servers to which the computer can access, or in different recording media on the user's computer. In addition, the medium may be distributed in a network-connected computer system whereby computer-readable codes may be stored in a distribution manner.

While the embodiments of the present invention have been described with reference to the accompanying drawings, it is to be understood that the present invention can be implemented in other practical forms without alteration of technical idea or essential features of the invention by those skilled in the art to which the present invention pertains. Therefore, it should be understood that the above-described embodiments are illustrative in all aspects and not restrictive.

The invention claimed is:
1. A plant cultivation device, comprising:
a case having a cultivation space and a door;
one or more sensors configured to detect a presence of a user near the door;
a tray disposed in the cultivation space and provided with a plurality of capsule accommodation parts on which plural capsules are placed;
a sensor module that senses the plural capsules and generates sensing information;
a light source module that emits light into the cultivation space;
a culture medium module for feeding a culture medium on the tray;
an air conditioning module that executes at least one operation of re-feeding (or recycling) a gas in the cultivation space or feeding external air to the cultivation space; and
a control module that receives sensing information transmitted from the sensor module and controls at least one of the light source module, the culture medium module and the air conditioning module using the sensing information,
wherein a seed to determine species thereof is received in each of the plural capsules,
each of the plural capsule accommodation parts has an active state in which at least one of the plural capsules is accommodated and an inactive state in which at least one of the plural capsules is not accommodated, and
the sensing information includes species information on species of each of the plural capsules and accommo- dation information on the state of each of the plural capsule accommodation parts, wherein the light source module comprises a plurality of lamp groups, each group including one or more lamps; and, wherein the control module is configured to determine whether an occurrence detected by the one or more sensors is a glare condition in which glare from the lamps is to be emitted to the user's eyes and, upon determining a presence of the glare condition, adjust a light intensity level from the lamps less than that of a normal condition pre-defined or selectively darken the one or more lamps adjacent to the door, wherein the glare condition includes a first glare condition in which a user approaches the door of the case, a second glare condition in which a user contacts the door of the case, and a third glare condition in which the door of the case is opened.

2. The plant cultivation device according to claim 1, wherein the control module controls the light source module using the species information such that an illumination value of the cultivation space becomes an average of desirable illuminations of the plural capsules.

3. A plant cultivation system including the plant cultivation device according to claim 2.

4. The plant cultivation device according to claim 1, wherein the control module uses the species information and implements at least one operation selected from:

control of the culture medium module such that a concentration of the culture medium fed to the tray becomes an average of desirable concentrations of the culture media in the plural capsules;

control of the culture medium module such that a feeding cycle of the culture medium fed to the tray becomes an average of desirable feeding cycles of the culture media in the plural capsules; and control of the culture medium module such that a feeding amount of the culture medium fed to the tray becomes an average of desirable feeding amounts of the culture media in the plural capsules.

5. A plant cultivation system including the plant cultivation device according to claim 4.

6. The plant cultivation device according to claim 1, wherein the control module controls the air conditioning module using the species information such that a temperature of the gas in the cultivation space becomes an average of desirable temperatures of the plural capsules.

7. A plant cultivation system including the plant cultivation device according to claim 6.

8. The plant cultivation device according to claim 1, wherein the light source module includes plural lamps, and the plural lamps are grouped into a plurality of lamp groups, while the control module independently controls the plural lamp groups using the state sensing information.

9. The plant cultivation device according to claim 8, wherein the lamps of the lamp group are arranged at places corresponding to respective capsule accommodation parts.

10. The plant cultivation device according to claim 9, wherein the plural capsule accommodation parts are arranged in a plurality of rows and a plurality of columns, and wherein the lamps of the lamp group are arranged along any one row or column of the capsule accommodation parts.

11. A plant cultivation system including the plant cultivation device according to claim 10.

12. A plant cultivation system including the plant cultivation device according to claim 9.

13. A plant cultivation system including the plant cultivation device according to claim 8.

14. A plant cultivation system including the plant cultivation device according to claim 1.

15. The plant cultivation device according to claim 1, wherein a reduced light level of the light source module is dependent upon (a) a magnitude proportional to the proximity of the user to the door, (b) the user's touching event of the cultivation device, and (c) a detected movement of the one or more sensors mounted on a body of the cultivation device.

16. The plant cultivation device according to claim 1, wherein the normal condition is a condition in which the glare condition does not occur.

* * * * *